US011356301B2

(12) United States Patent
Manolakos et al.

(10) Patent No.: US 11,356,301 B2
(45) Date of Patent: Jun. 7, 2022

(54) DETERMINING A PATH LOSS FOR SEMI-PERSISTENT SOUNDING REFERENCE SIGNALS FOR POSITIONING

(71) Applicant: QUALCOMM Incorporated, San Diego, CA (US)

(72) Inventors: Alexandros Manolakos, Escondido, CA (US); Sony Akkarakaran, Poway, CA (US); Sven Fischer, Nuremberg (DE)

(73) Assignee: QUALCOMM Incorporated, San Diego, CA (US)

( * ) Notice: Subject to any disclaimer, the term of this patent is extended or adjusted under 35 U.S.C. 154(b) by 23 days.

(21) Appl. No.: 16/988,788

(22) Filed: Aug. 10, 2020

(65) Prior Publication Data

US 2021/0297289 A1 Sep. 23, 2021

(30) Foreign Application Priority Data

Mar. 19, 2020 (GR) .............................. 20200100145

(51) Int. Cl.
*H04L 25/02* (2006.01)
*H04L 5/00* (2006.01)
(Continued)

(52) U.S. Cl.
CPC ........ *H04L 25/0226* (2013.01); *H04L 5/0051* (2013.01); *H04W 52/242* (2013.01);
(Continued)

(58) Field of Classification Search
CPC . H04L 5/0025; H04L 5/0051; H04L 25/0224; H04L 25/0226; H04W 52/146;
(Continued)

(56) References Cited

U.S. PATENT DOCUMENTS

2019/0281588 A1* 9/2019 Zhang ................. H04W 52/242
2019/0313348 A1* 10/2019 MolavianJazi ..... H04W 52/367
(Continued)

OTHER PUBLICATIONS

International Search Report and Written Opinion—PCT/US2021/018680—ISA/EPO—dated May 25, 2021.
(Continued)

*Primary Examiner* — Pao Sinkantarakorn
(74) *Attorney, Agent, or Firm* — Hunter Clark PLLC

(57) ABSTRACT

Techniques are provided for determining a path loss for semi-persistent SRS-for-positioning if the path loss resource set is not updatable through a MAC CE. An example method according to the disclosure includes receiving, from a serving base station, a medium access control control element, determining a spatial relation reference of a first sounding reference signal resource, setting a path loss reference for a sounding reference signal for positioning resource set to the spatial relation reference if the spatial relation reference is not an uplink reference signal, setting the path loss reference equal to a reference system resource from a synchronization signal block the user equipment utilizes to obtain a master information block if the spatial relation reference is an uplink reference signal, and transmitting the resources of the sounding reference signal for positioning resource set based at least in part on the path loss reference.

57 Claims, 19 Drawing Sheets

(51) Int. Cl.
*H04W 80/02* (2009.01)
*H04W 76/27* (2018.01)
*H04W 56/00* (2009.01)
*H04W 52/36* (2009.01)
*H04W 52/24* (2009.01)

(52) U.S. Cl.
CPC ....... *H04W 52/367* (2013.01); *H04W 56/001* (2013.01); *H04W 76/27* (2018.02); *H04W 80/02* (2013.01)

(58) Field of Classification Search
CPC .............. H04W 52/242; H04W 52/325; H04W 52/367
See application file for complete search history.

(56) References Cited

U.S. PATENT DOCUMENTS

| | | |
|---|---|---|
| 2020/0053710 A1 | 2/2020 | Molavianjazi et al. |
| 2021/0029650 A1* | 1/2021 | Cirik ................... H04W 52/242 |

OTHER PUBLICATIONS

Qualcomm Incorporated: "Summary #2 of 7.2.10.4: PHY Procedures for Positioning Measurements", 3GPP Draft, 3GPP TSG-RAN WG1 Meeting #98bis, R1-1911627, (FL Summary for 7.2.10.4: PHY Procedures for Positioning Measurements) V3, 3rd Generation Partnership Project (3GPP), Mobile Competence Centre, 650, Route Des Lucioles, F-069, vol. RAN WG1, No. Chongqing, China, Oct. 14, 2019-Oct. 20, 2019, Oct. 22, 2019 (Oct. 22, 2019), XP051798973, 27 Pages, Retrieved from the Internet: URL: http://www.3gpp.org/ftp/tsg_ran/WG1_RL1/TSGR1_98b/Docs/R1-1911527 zip [retrieved on Oct. 22, 2019]p. 9, paragraph intel_13 paragraph Futurewei Proposal 4; p. 24 Fallback behavior; p. 24.
Qualcomm Incorporated: "UL Reference Signals for NR Positioning", 3GPP Draft, 3GPP TSG RAN WG1 #98, R1-1909279, 3rd Generation Partnership Project (3GPP), Mobile Competence Centre, 650, Route Des Lucioles, F-06921 Sophia-Antipolis Cedex, France, vol. RAN WG1, No. Prague, Czech Republic, Aug. 26, 2019-Aug. 30, 2019, Aug. 17, 2019 (Aug. 17, 2019), XP051765884, 6 Pages, Retrieved from the Internet: URL: http://www.3gpp.org/ftp/tsg_ran/WG1_RL1/TSGR1_98/Docs/R1-1909279.zip [retrieved on Aug. 17, 2019] p. 1, paragraph 3 p. 3, paragraph 4 figure 3.
VIVO: "Discussion on Physical-Layer Procedures for UE/gNB Measurements", 3GPP Draft, 3GPP TSG RAN WG1 #98bis, R1-1910240, 3rd Generation Partnership Project (3GPP), Mobile Competence Centre, 650, Route Des Lucioles, F-06921 Sophia-Antipolis Cedex, France, vol. RAN WG1, No. Chongqing, China, Oct. 14, 2019-Oct. 20, 2019, Oct. 4, 2019 (Oct. 4, 2019), XP051808143, 8 pages, Retrieved from the Internet: URL: http://www.3gpp.org/ftp/tsg_ran/WG_RL1/WG1_RL1/TSGR1_98b/Docs/R1-1910240.zip. [retrieved on Oct. 4, 2019] p. 4, paragraph 3.2, p. 6, paragraph 4.

* cited by examiner

User Plane Protocol Stack

Control Plane Protocol Stack

```
BWP-UplinkDedicated ::=        SEQUENCE {
    pucch-Config                   SetupRelease { PUCCH-Config }               OPTIONAL,   -- Need M
    pusch-Config                   SetupRelease { PUSCH-Config }               OPTIONAL,   -- Need M
    configuredGrantConfig          SetupRelease { ConfiguredGrantConfig }      OPTIONAL,   -- Need M
    srs-Config                     SetupRelease { SRS-Config }                 OPTIONAL,   -- Need M
    beamFailureRecoveryConfig      SetupRelease { BeamFailureRecoveryConfig }  OPTIONAL,   -- Cond SpCellOnly
    ...
}
```

*FIG. 6A*

```
SRS-Config ::=       SEQUENCE {
    srs-ResourceSetToReleaseList              ...                                                        OPTIONAL, -- Need N
    srs-ResourceSetToAddModList               ...                                                        OPTIONAL, -- Need N
    srs-ResourceToReleaseList                 SEQUENCE (SIZE (1..maxNrofSRS-ResourceSets)) OF SRS-ResourceSetId  OPTIONAL, -- Need N
    srs-ResourceToAddModList                  SEQUENCE (SIZE (1..maxNrofSRS-ResourceSets)) OF SRS-ResourceSet    OPTIONAL, -- Need N
                                              SEQUENCE (SIZE (1..maxNrofSRS-Resources)) OF SRS-ResourceId
                                              SEQUENCE (SIZE (1..maxNrofSRS-Resources)) OF SRS-Resource
    tpc-Accumulation                          ENUMERATED {disabled}                                      OPTIONAL  -- Need S
    ...
}

SRS-Resource ::=     SEQUENCE {
    srs-ResourceId                            SRS-ResourceId,
    ...
    spatialRelationInfo                       SRS-SpatialRelationInfo                                    OPTIONAL  -- Need R
    ...
}

SRS-SpatialRelationInfo ::= SEQUENCE {
    servingCellId                             ServCellIndex                                              OPTIONAL, -- Need S
    referenceSignal                           CHOICE {
        ssb-Index                                 SSB-Index,
        csi-RS-Index                              NZP-CSI-RS-ResourceId,
        srs                                       SEQUENCE {
            resourceId                                SRS-ResourceId,
            uplinkBWP                                 BWP-Id
        }
    }
}
```

*FIG. 6B*

DETERMINING A PATH LOSS FOR SEMI-PERSISTENT SOUNDING REFERENCE SIGNALS FOR POSITIONING

CROSS-REFERENCE TO RELATED APPLICATION

This application claims the benefit of Greek Application No. 20200100145, filed Mar. 19, 2020, entitled "DETERMINING A PATH LOSS FOR SEMI-PERSISTENT SOUNDING REFERENCE SIGNALS FOR POSITIONING," which is assigned to the assignee hereof, and the entire contents of which are hereby incorporated herein by reference for all purposes.

BACKGROUND OF THE DISCLOSURE

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile access (GSM) variation of TDMA, etc.

A fifth generation (5G) wireless standard, referred to as New Radio (NR), calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard.

It is often desirable to know the location of a user equipment (UE), e.g., a cellular phone, with the terms "location" and "position" being synonymous and used interchangeably herein. A location services (LCS) client may desire to know the location of the UE and may communicate with a location center in order to request the location of the UE. The location center and the UE may exchange messages, as appropriate, to obtain a location estimate for the UE. The location center may return the location estimate to the LCS client, e.g., for use in one or more applications. Obtaining the location of a mobile device that is accessing a wireless network may be useful for many applications including, for example, emergency calls, personal navigation, asset tracking, locating a friend or family member, etc. Existing positioning methods include methods based on measuring radio signals transmitted from a variety of devices including satellite vehicles and terrestrial radio sources in a wireless network such as base stations and access points. Terrestrial positioning methods utilize signaling between a mobile device and network stations. Position accuracy may be enhanced and latency may be substantially reduced with the implementation of signaling efficiencies in the network.

SUMMARY

An example of a method of wireless communication performed by a user equipment according to the disclosure includes receiving, from a serving base station, a medium access control control element, determining a spatial relation reference of a first sounding reference signal resource, setting a path loss reference for a sounding reference signal for positioning resource set to the spatial relation reference if the spatial relation reference is not an uplink reference signal, setting the path loss reference equal to a reference system resource from a synchronization signal block the user equipment utilizes to obtain a master information block if the spatial relation reference is an uplink reference signal, and transmitting the resources of the sounding reference signal for positioning resource set based at least in part on the path loss reference.

Implementations of such a method may include one or more of the following features. The medium access control control element may be configured to update the spatial relation reference of the first sounding reference signal resource. The sounding reference signal for positioning resource set may be received from the serving base station via radio resource control signaling, such that the first sounding reference signal resource is included in the sounding reference signal for positioning resource set. Transmitting the all the resources of the sounding reference signal for positioning resource set may include adjusting a transmit power of the resources based at least in part on the path loss reference. The spatial relation reference may be a downlink reference signal. The downlink reference signal may be a channel state information reference signal or a synchronization signal reference signal. The downlink reference signal may be from a neighboring cell. The synchronization signal block may include a primary synchronization signal, a secondary synchronization signal, or a physical broadcast channel.

An example of a method of wireless communication performed by a user equipment according to the disclosure includes receiving, from a serving base station, a medium access control control element, determining a first sounding reference signal resource that has a downlink reference signal as a spatial relation reference, setting a path loss reference for a sounding reference signal for positioning resource set equal to the spatial relation reference associated with the first sounding reference signal resource, and transmitting the sounding reference signal resources of the set based at least in part on the path loss reference.

Implementations of such a method may include one or more of the following features. Setting the path loss reference equal to a reference system resource from a synchronization signal block the user equipment utilizes to obtain a master information block if there is no spatial relation associated with a downlink reference signal. The synchronization signal block may include a primary synchronization signal, a secondary synchronization signal, or a physical broadcast channel. The medium access control control element may be configured to update the spatial relation reference of the first sounding reference signal resource. The sounding reference signal for positioning resource set may be received from the serving base station via radio resource control signaling, such that the first sounding reference signal resource is included in the sounding reference signal for positioning resource set. Transmitting the sounding reference signal resources of the set may include adjusting a transmit power of the resources based on the path loss reference. The spatial relation reference may be from a neighboring cell.

An example of a method of wireless communication performed by a user equipment according to the disclosure includes receiving, from a serving base station, a medium access control control element, determining a spatial relation reference of an indexed sounding reference signal for positioning resource set, setting a path loss reference for a sounding reference signal for positioning resource set equal to the spatial relation reference, and transmitting the sounding reference signal resources of the set based at least in part on the path loss reference.

Implementations of such a method may include one or more of the following features. The medium access control control element may be configured to update the spatial relation reference of the indexed sounding reference signal for positioning resource set. The indexed sounding reference signal for positioning resource set may be received from the serving base station via radio resource control signaling. Transmitting the sounding reference signal resources of the set may include adjusting a transmit power of the resources based on the path loss reference. The indexed sounding reference signal for positioning resource set may include a plurality of sounding reference signal resources and the path loss reference is used for each of the plurality of sounding reference signal resources.

An example apparatus for wireless communication according to the disclosure includes a memory, a transceiver, at least one processor operably coupled to the memory and the transceiver and configured to receive, from a serving base station, a medium access control control element, determine a spatial relation reference of a first sounding reference signal resource, set a path loss reference for a sounding reference signal for positioning resource set to the spatial relation reference if the spatial relation reference is not an uplink reference signal, set the path loss reference equal to a reference system resource from a synchronization signal block a user equipment utilizes to obtain a master information block if the spatial relation reference is an uplink reference signal, and transmit the resources of the sounding reference signal for positioning resource set based at least in part on the path loss reference.

Implementations of such an apparatus may include one or more of the following features. The medium access control control element may be configured to update the spatial relation reference of the first sounding reference signal resource. The at least one processor may be further configured to receive the sounding reference signal for positioning resource set from the serving base station via radio resource control signaling, such that the first sounding reference signal resource is included in the sounding reference signal for positioning resource set. The at least one processor may be further configured to adjust a transmit power of the resources based at least in part on the path loss reference. The spatial relation reference may be a downlink reference signal. The downlink reference signal may be a channel state information reference signal or a synchronization signal reference signal. The downlink reference signal may be from a neighboring cell. The synchronization signal block may include a primary synchronization signal, a secondary synchronization signal, or a physical broadcast channel.

An example apparatus for wireless communication according to the disclosure includes a memory, a transceiver, at least one processor operably coupled to the memory and the transceiver and configured to receive, from a serving base station, a medium access control control element, determine a first sounding reference signal resource that has a downlink reference signal as a spatial relation reference, set a path loss reference for a sounding reference signal for positioning resource set equal to the spatial relation reference associated with the first sounding reference signal resource, and transmit the sounding reference signal resources of the set based at least in part on the path loss reference.

Implementations of such an apparatus may include one or more of the following features. The at least one processor may be further configured to set the path loss reference equal to a reference system resource from a synchronization signal block a user equipment utilizes to obtain a master information block if there is no spatial relation associated with a downlink reference signal. The synchronization signal block may include a primary synchronization signal, a secondary synchronization signal, or a physical broadcast channel. The medium access control control element may be configured to update the spatial relation reference of the first sounding reference signal resource. The at least one processor may be further configured to receive the sounding reference signal for positioning resource set from the serving base station via radio resource control signaling, wherein the first sounding reference signal resource is included in the sounding reference signal for positioning resource set. The at least one processor may be further configured to adjust a transmit power of the resources based on the path loss reference. The spatial relation reference may be from a neighboring cell.

An example apparatus for wireless communication according to the disclosure includes a memory, a transceiver, at least one processor operably coupled to the memory and the transceiver and configured to receive, from a serving base station, a medium access control control element, determine a spatial relation reference of an indexed sounding reference signal for positioning resource set, set a path loss reference for a sounding reference signal for positioning resource set equal to the spatial relation reference, and transmit the sounding reference signal resources of the set based at least in part on the path loss reference.

Implementations of such an apparatus may include one or more of the following features. The medium access control control element may be configured to update the spatial relation reference of the indexed sounding reference signal for positioning resource set. The at least one processor may be further configured to receive the indexed sounding reference signal for positioning resource set from the serving base station via radio resource control signaling. The at least one processor may be further configured to adjust a transmit power of the resources based on the path loss reference. The indexed sounding reference signal for positioning resource set may include a plurality of sounding reference signal resources and the path loss reference is used for each of the plurality of sounding reference signal resources.

An example apparatus for wireless communication according to the disclosure includes means for receiving, from a serving base station, a medium access control control element, means for determining a spatial relation reference of a first sounding reference signal resource, means for setting a path loss reference for a sounding reference signal for positioning resource set to the spatial relation reference if the spatial relation reference is not an uplink reference signal, means for setting the path loss reference equal to a reference system resource from a synchronization signal block a user equipment utilizes to obtain a master information block if the spatial relation reference is an uplink reference signal, and means for transmitting the resources of the sounding reference signal for positioning resource set based at least in part on the path loss reference.

An example apparatus for wireless communication according to the disclosure includes means for receiving, from a serving base station, a medium access control control element, means for determining a first sounding reference signal resource that has a downlink reference signal as a spatial relation reference, means for setting a path loss reference for a sounding reference signal for positioning resource set equal to the spatial relation reference associated with the first sounding reference signal resource, and means for transmitting the sounding reference signal resources of the set based at least in part on the path loss reference.

An example apparatus for wireless communication according to the disclosure includes means for receiving, from a serving base station, a medium access control control element, means for determining a spatial relation reference of an indexed sounding reference signal for positioning resource set, means for setting a path loss reference for a sounding reference signal for positioning resource set equal to the spatial relation reference, and means for transmitting the sounding reference signal resources of the set based at least in part on the path loss reference.

An example non-transitory processor-readable storage medium comprising processor-readable instructions configured to cause one or more processors in a user equipment to communicate wirelessly according to the disclosure includes code for receiving, from a serving base station, a medium access control control element, code for determining a spatial relation reference of a first sounding reference signal resource, code for setting a path loss reference for a sounding reference signal for positioning resource set to the spatial relation reference if the spatial relation reference is not an uplink reference signal, code for setting the path loss reference equal to a reference system resource from a synchronization signal block the user equipment utilizes to obtain a master information block if the spatial relation reference is an uplink reference signal, and code for transmitting the resources of the sounding reference signal for positioning resource set based at least in part on the path loss reference.

An example non-transitory processor-readable storage medium comprising processor-readable instructions configured to cause one or more processors in a user equipment to communicate wirelessly according to the disclosure includes code for receiving, from a serving base station, a medium access control control element, code for determining a first sounding reference signal resource that has a downlink reference signal as a spatial relation reference, code for setting a path loss reference for a sounding reference signal for positioning resource set equal to the spatial relation reference associated with the first sounding reference signal resource, and code for transmitting the sounding reference signal resources of the set based at least in part on the path loss reference.

An example non-transitory processor-readable storage medium comprising processor-readable instructions configured to cause one or more processors in a user equipment to communicate wirelessly according to the disclosure includes code for receiving, from a serving base station, a medium access control control element, code for determining a spatial relation reference of an indexed sounding reference signal for positioning resource set, code for setting a path loss reference for a sounding reference signal for positioning resource set equal to the spatial relation reference, and code for transmitting the sounding reference signal resources of the set based at least in part on the path loss reference.

BRIEF DESCRIPTION OF THE DRAWINGS

The accompanying drawings are presented to aid in the description of examples of one or more aspects of the disclosed subject matter and are provided solely for illustration of the examples and not limitation thereof:

FIG. 6A illustrates how a sounding reference signal (SRS) configuration is defined per bandwidth part (BWP).

FIG. 6B illustrates how SRS resource sets and/or SRS resources are configured within an SRS configuration.

DETAILED DESCRIPTION

Figure 1:
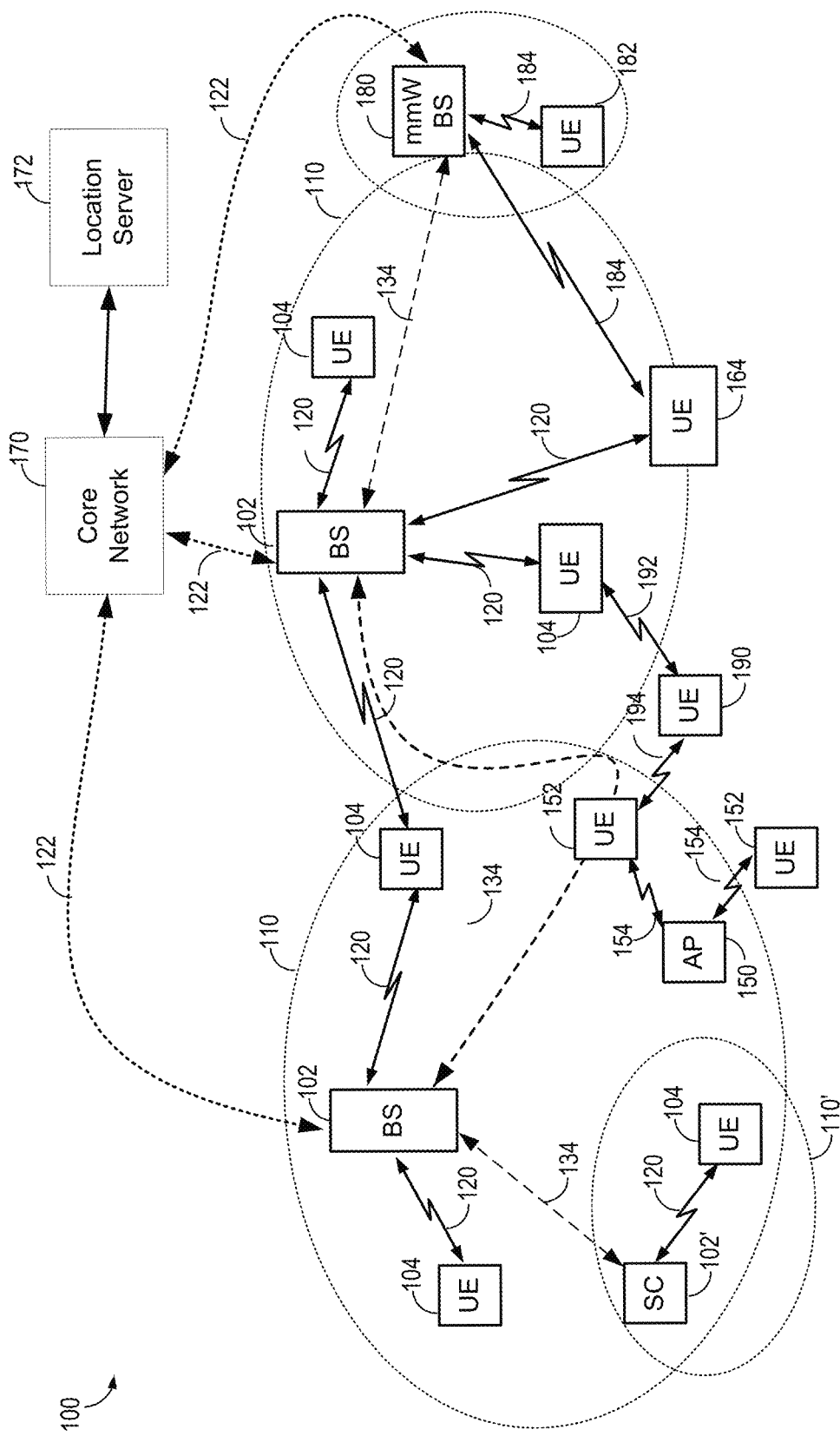
FIG. 1 illustrates an exemplary wireless communications system, according to various aspects.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a New Radio (NR) Node B (also referred to as a gNB or gNodeB), etc. In addition, in some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an UL/reverse or DL/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference RF signals the UE is measuring. Because a TRP is the point from which a base station transmits and receives wireless signals, as used herein, references to transmission from or reception at a base station are to be understood as referring to a particular TRP of the base station.

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal.

Referring to FIG. 1, an exemplary wireless communications system 100 is shown. The wireless communications system 100 (which may also be referred to as a wireless wide area network (WWAN)) may include various base stations 102 (labelled "BS") and various UEs 104. The base stations 102 may include macro cell base stations (high power cellular base stations) and/or small cell base stations (low power cellular base stations). In an aspect, the macro cell base stations 102 may include eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or next generation core (NGC)) through backhaul links 122, and through the core network 170 to one or more location servers 172. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/NGC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both the logical communication entity and the base station that supports it, depending on the context. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' (labelled "SC" for "small cell") may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include UL (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to DL and UL (e.g., more or less carriers may be allocated for DL than for UL).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-collocated, meaning that they appear to the receiver (e.g., a UE) as having the same parameters, regardless of whether or not the transmitting antennas of the network node themselves are physically collocated. In NR, there are four types of quasi-collocation (QCL) relations. Specifically, a QCL relation of a given type means that certain parameters about a second reference RF signal on a second beam can be determined from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Transmit and receive beams may be spatially related. A spatial relation means that parameters for a second beam (e.g., a transmit or receive beam) for a second reference signal can be determined from information about a first beam (e.g., a receive beam or a transmit beam) for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include one or more UEs, such as UE 190, that connects indirectly to one or more communication networks via one or more device-to-device (D2D) peer-to-peer (P2P) links. In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

Figure 2A:
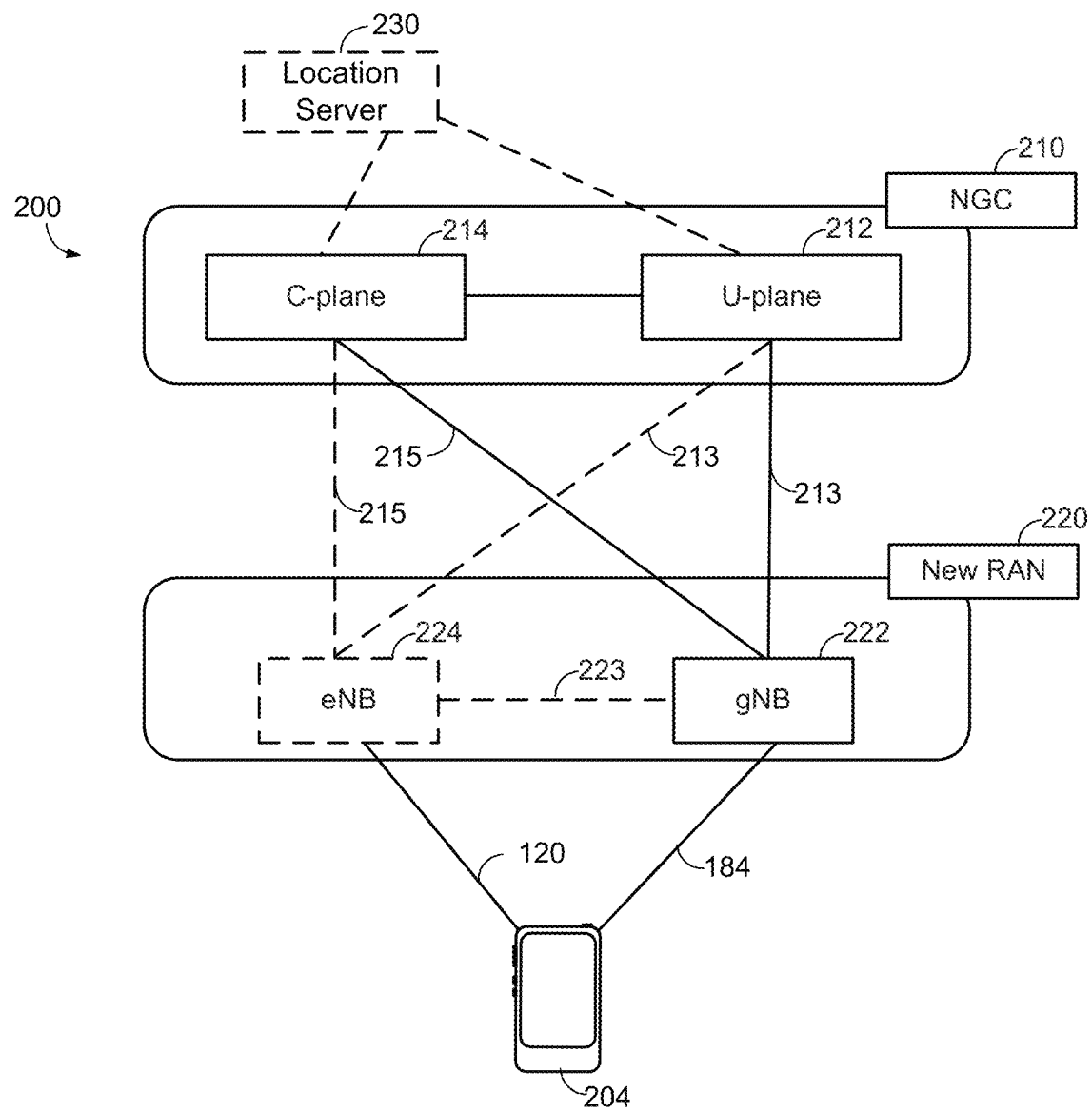
FIGS. 2A and 2B illustrate example wireless network structures, according to various aspects.

Referring to FIG. 2A, an exemplary wireless network structure 200 is shown. For example, an NGC 210 (also referred to as a "5GC") can be viewed functionally as control plane functions (C-plane) 214 (e.g., UE registration, authentication, network access, gateway selection, etc.) and user plane functions (U-plane) 212 (e.g., UE gateway function, access to data networks, IP routing, etc.), which operate cooperatively to form the core network. User plane interface (NG-U) 213 and control plane interface (NG-C) 215 connect the gNB 222 to the NGC 210 and specifically to the user plane functions 212 and control plane functions 214, respectively. In an additional configuration, an eNB 224 may also be connected to the NGC 210 via NG-C 215 to the control plane functions 214 and NG-U 213 to user plane functions 212. Further, eNB 224 may directly communicate with gNB 222 via a backhaul connection 223. In some configurations, the New RAN 220 may only have one or more gNBs 222, while other configurations include one or more of both eNBs 224 and gNBs 222. Either gNB 222 or eNB 224 may communicate with UEs 204 (e.g., any of the UEs depicted in FIG. 1). Another optional aspect may include location server 230, which may be in communication with the NGC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, NGC 210, and/or via the Internet (not illustrated). Further, the location server 230 may be integrated into a component of the core network, or alternatively may be external to the core network.

Figure 2B:
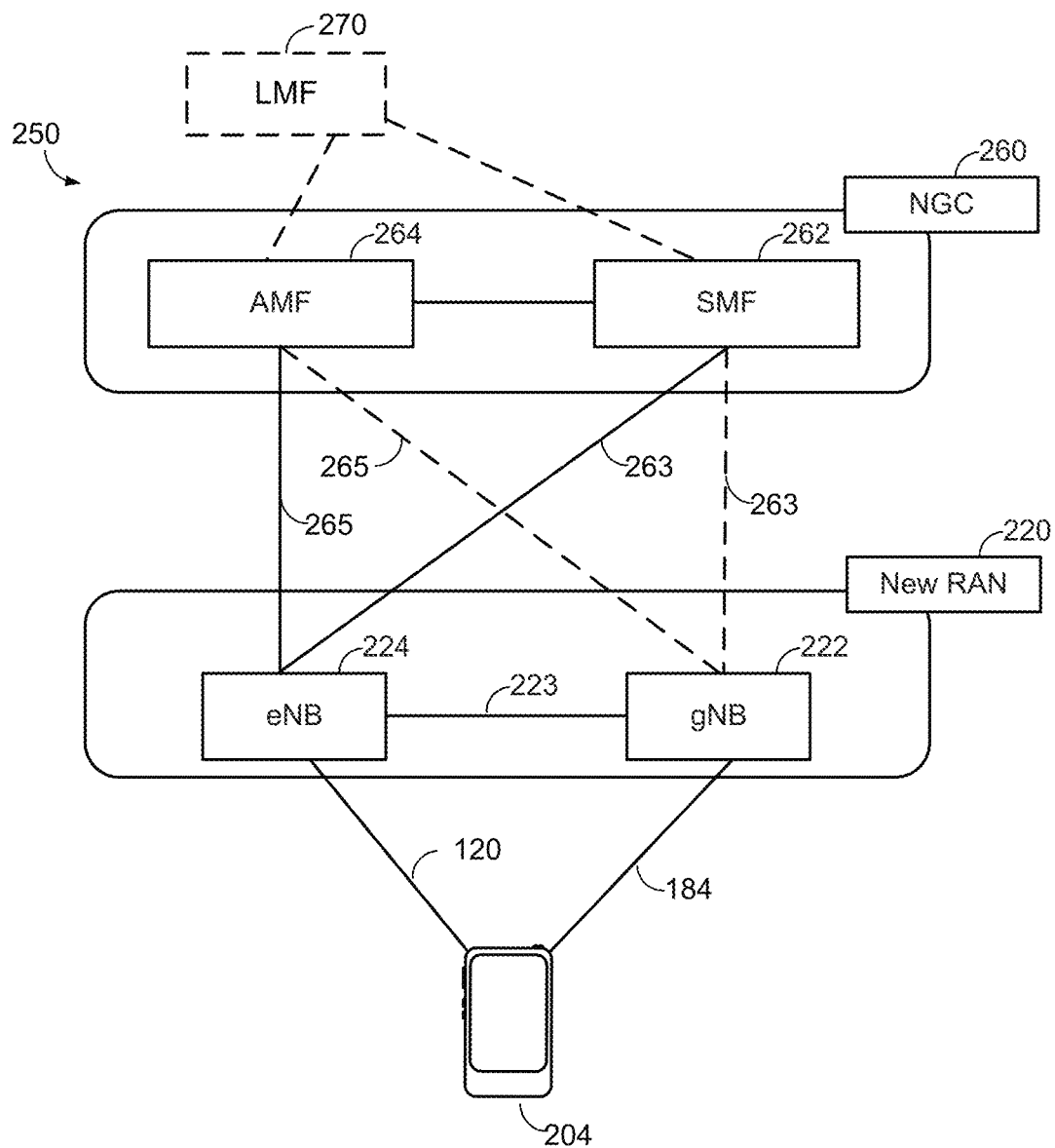

Referring to FIG. 2B, another exemplary wireless network structure 250 is shown. For example, an NGC 260 (also referred to as a "5GC") can be viewed functionally as control plane functions, provided by an access and mobility management function (AMF)/user plane function (UPF) 264, and user plane functions, provided by a session management function (SMF) 262, which operate cooperatively to form the core network (i.e., NGC 260). User plane interface 263 and control plane interface 265 connect the eNB 224 to the NGC 260 and specifically to SMF 262 and AMF/UPF 264, respectively. In an additional configuration, a gNB 222 may also be connected to the NGC 260 via control plane interface 265 to AMF/UPF 264 and user plane interface 263 to SMF 262. Further, eNB 224 may directly communicate with gNB 222 via the backhaul connection 223, with or without gNB direct connectivity to the NGC 260. In some configurations, the New RAN 220 may only have one or more gNBs 222, while other configurations include one or more of both eNBs 224 and gNBs 222. Either gNB 222 or eNB 224 may communicate with UEs 204 (e.g., any of the UEs depicted in FIG. 1). The base stations of the New RAN 220 communicate with the AMF-side of the AMF/UPF 264 over the N2 interface and the UPF-side of the AMF/UPF 264 over the N3 interface.

The functions of the AMF include registration management, connection management, reachability management, mobility management, lawful interception, transport for session management (SM) messages between the UE 204 and the SMF 262, transparent proxy services for routing SM messages, access authentication and access authorization, transport for short message service (SMS) messages between the UE 204 and the short message service function (SMSF) (not shown), and security anchor functionality (SEAF). The AMF also interacts with the authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF retrieves the security material from the AUSF. The functions of the AMF also include security context management (SCM). The SCM receives a key from the SEAF that it uses to determine access-network specific keys. The functionality of the AMF also includes location services management for regulatory services, transport for location services messages between the UE 204 and the location management function (LMF) 270, as well as between the New RAN 220 and the LMF 270, evolved packet system (EPS) bearer identifier allocation for interworking with the EPS, and UE 204 mobility event notification. In addition, the AMF also supports functionalities for non-3GPP access networks.

Functions of the UPF include acting as an anchor point for intra-/inter-RAT mobility (when applicable), acting as an external protocol data unit (PDU) session point of interconnect to the data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., UL/DL rate enforcement, reflective QoS marking in the DL), UL traffic verification (service data flow (SDF) to QoS flow mapping), transport level packet marking in the UL and DL, DL packet buffering and DL data notification triggering, and sending and forwarding of one or more "end markers" to the source RAN node.

The functions of the SMF 262 include session management, UE Internet protocol (IP) address allocation and management, selection and control of user plane functions, configuration of traffic steering at the UPF to route traffic to the proper destination, control of part of policy enforcement and QoS, and downlink data notification. The interface over which the SMF 262 communicates with the AMF-side of the AMF/UPF 264 is referred to as the N11 interface.

Another optional aspect may include a LMF 270, which may be in communication with the NGC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, NGC 260, and/or via the Internet (not illustrated).

Figure 3A:
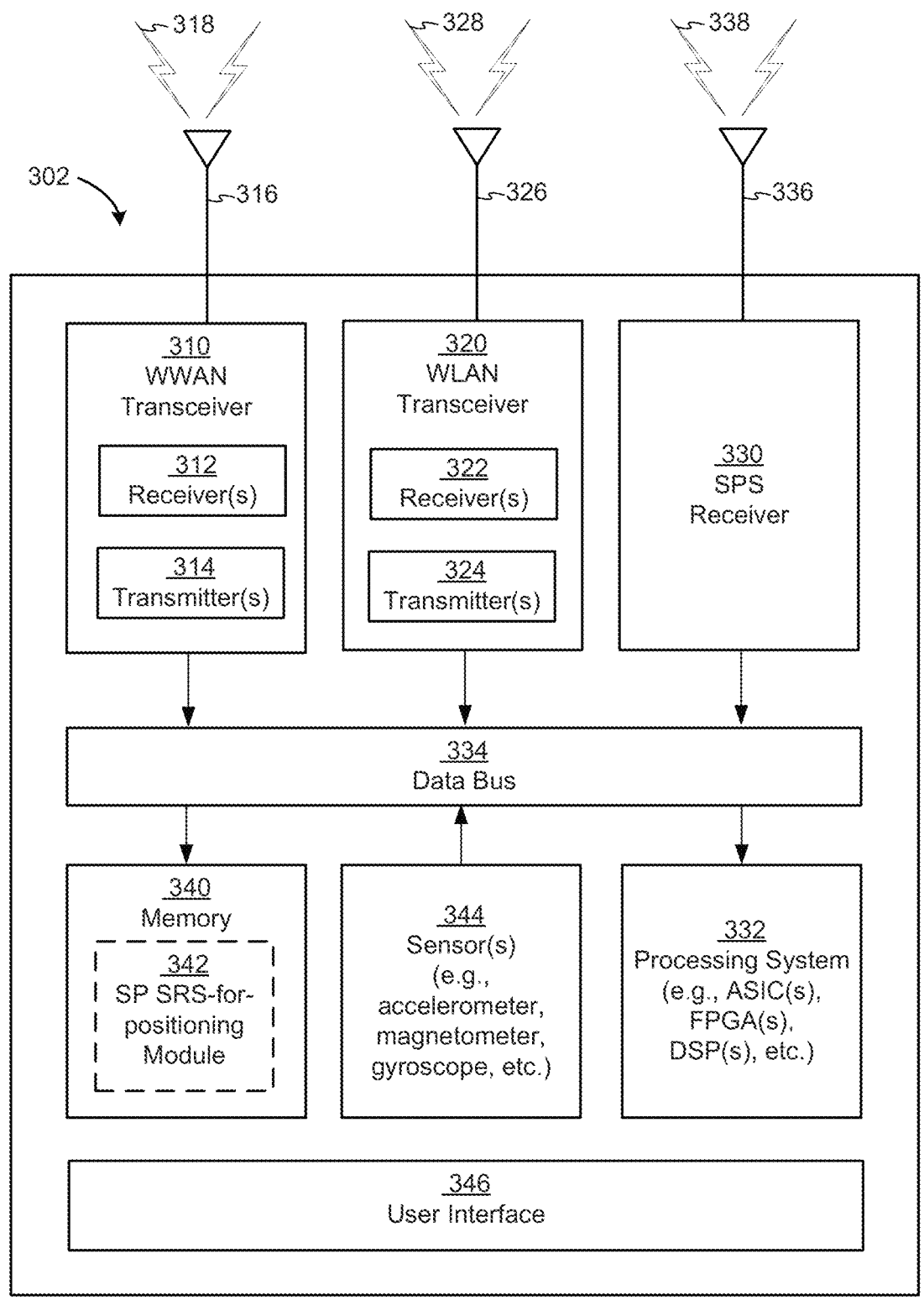
FIGS. 3A to 3C are simplified block diagrams of several sample aspects of components that may be employed in wireless communication nodes and configured to support communication as taught herein.
Figure 3B:
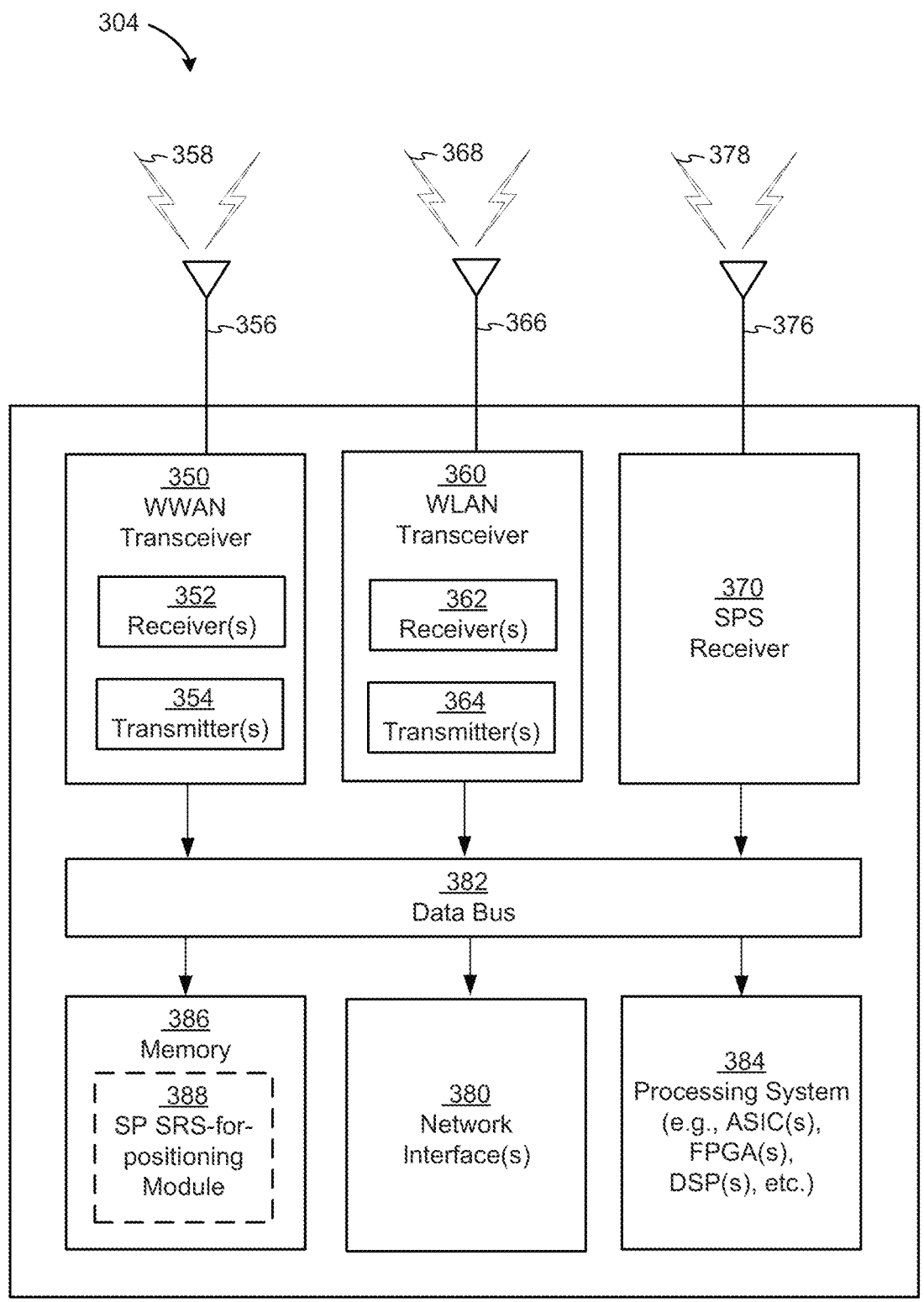
Figure 3C:
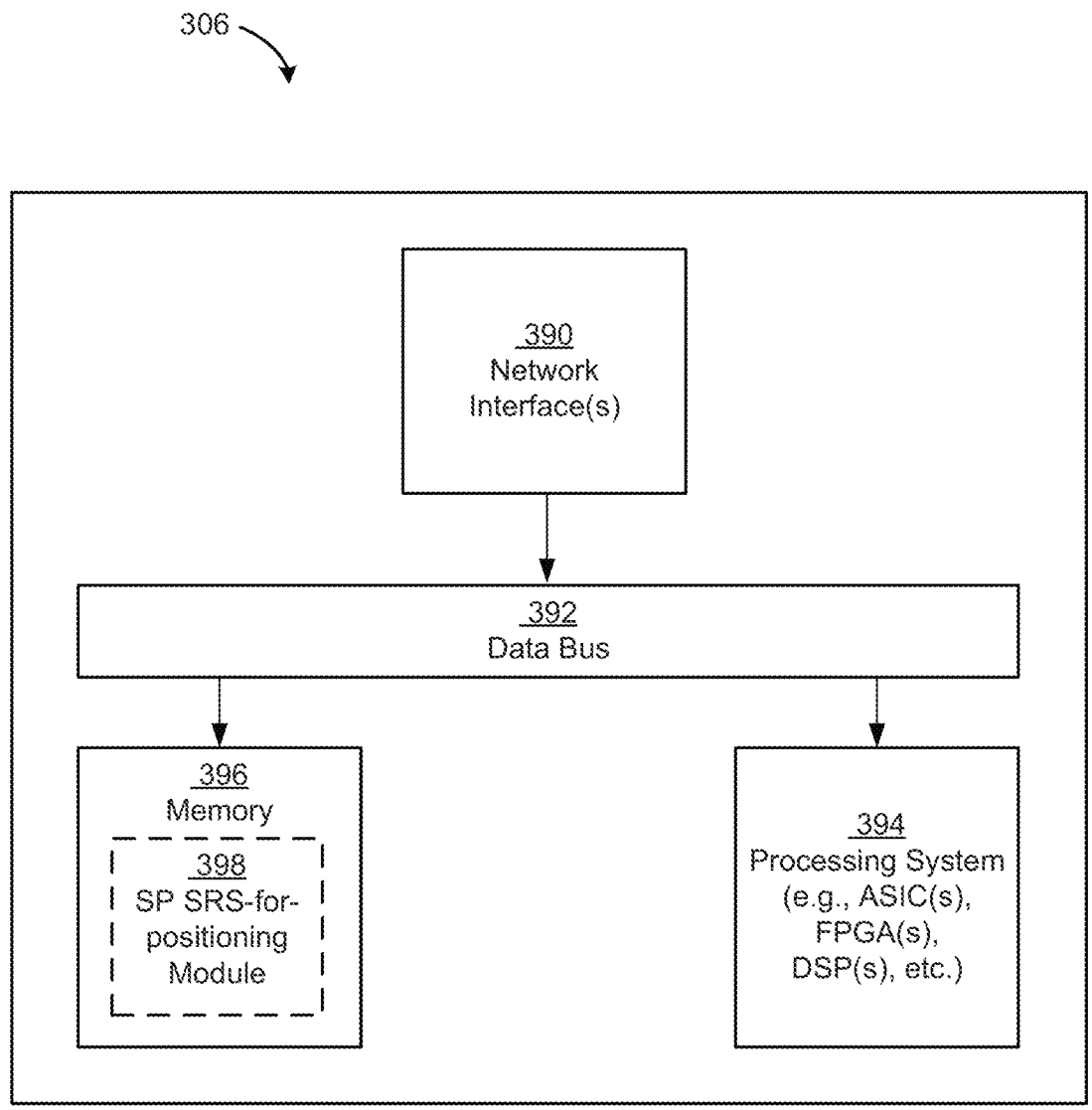

Referring to FIGS. 3A, 3B and 3C, several exemplary components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270) to support the file transmission operations as taught herein are shown. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include wireless wide area network (WWAN) transceiver 310 and 350, respectively, configured to communicate via one or more wireless communication networks (not shown), such as an NR network, an LTE network, a GSM network, and/or the like. The WWAN transceivers 310 and 350 may be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 also include, at least in some cases, wireless local area network (WLAN) transceivers 320 and 360, respectively. The WLAN transceivers 320 and 360 may be connected to one or more antennas 326 and 366, respectively, for communicating with other network nodes, such as other UEs, access points, base stations, etc., via at least one designated RAT (e.g., WiFi, LTE-D, Bluetooth®, etc.) over a wireless communication medium of interest. The WLAN transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively.

Transceiver circuitry including at least one transmitter and at least one receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In an aspect, a transmitter may include or be coupled to a plurality of antennas (e.g., antennas 316, 326, 356, 366), such as an antenna array, that permits the respective apparatus to perform transmit "beamforming," as described herein. Similarly, a receiver may include or be coupled to a plurality of antennas (e.g., antennas 316, 326, 356, 366), such as an antenna array, that permits the respective apparatus to perform receive beamforming, as described herein. In an aspect, the transmitter and receiver may share the same plurality of antennas (e.g., antennas 316, 326, 356, 366), such that the respective apparatus can only receive or transmit at a given time, not both at the same time. A wireless communication device (e.g., one or both of the transceivers 310 and 320 and/or 350 and 360) of the UE 302 and/or the base station 304 may also comprise a network listen module (NLM) or the like for performing various measurements.

The UE 302 and the base station 304 also include, at least in some cases, satellite positioning systems (SPS) receivers 330 and 370. The SPS receivers 330 and 370 may be connected to one or more antennas 336 and 376, respectively, for receiving SPS signals 338 and 378, respectively, such as global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. The SPS receivers 330 and 370 may comprise any suitable hardware and/or software for receiving and processing SPS signals 338 and 378, respectively. The SPS receivers 330 and 370 request information and operations as appropriate from the other systems, and performs calculations necessary to determine positions of the UE 302 and the base station 304 using measurements obtained by any suitable SPS algorithm.

The base station 304 and the network entity 306 each include at least one network interfaces 380 and 390 for communicating with other network entities. For example, the network interfaces 380 and 390 (e.g., one or more network access ports) may be configured to communicate with one or more network entities via a wire-based or wireless backhaul connection. In some aspects, the network interfaces 380 and 390 may be implemented as transceivers configured to support wire-based or wireless signal communication. This communication may involve, for example, sending and receiving messages, parameters, and/or other types of information.

The UE 302, the base station 304, and the network entity 306 also include other components that may be used in conjunction with the operations as disclosed herein. The UE 302 includes processor circuitry implementing a processing system 332 for providing functionality relating to, for example, sounding reference signals (SRS) transmissions as disclosed herein, and for providing other processing functionality. The base station 304 includes a processing system 384 for providing functionality relating to, for example, SRS configuration and reception as disclosed herein, and for providing other processing functionality. The network entity 306 includes a processing system 394 for providing functionality relating to, for example, SRS configuration as disclosed herein, and for providing other processing functionality. In an aspect, the processing systems 332, 384, and 394 may include, for example, one or more general purpose processors, multi-core processors, ASICs, digital signal processors (DSPs), field programmable gate arrays (FPGA), or other programmable logic devices or processing circuitry.

The UE 302, the base station 304, and the network entity 306 include memory circuitry implementing memory components 340, 386, and 396 (e.g., each including a memory device), respectively, for maintaining information (e.g., information indicative of reserved resources, thresholds, parameters, and so on). In some cases, the UE 302, the base station 304, and the network entity 306 may include SP SRS-for-positioning module 342, 388, and 398, respectively. The SP SRS-for-positioning module 342, 388, and 398 may be hardware circuits that are part of or coupled to the processing systems 332, 384, and 394, respectively, that, when executed, cause the UE 302, the base station 304, and the network entity 306 to perform the functionality described herein. Alternatively, the SP SRS-for-positioning module 342, 388, and 398 may be memory modules (as shown in FIGS. 3A-C) stored in the memory components 340, 386, and 396, respectively, that, when executed by the processing systems 332, 384, and 394, cause the UE 302, the base station 304, and the network entity 306 to perform the functionality described herein.

The UE 302 may include one or more sensors 344 coupled to the processing system 332 to provide movement and/or orientation information that is independent of motion data derived from signals received by the WWAN transceiver 310, the WLAN transceiver 320, and/or the GPS receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in 2D and/or 3D coordinate systems.

In addition, the UE 302 includes a user interface 346 for providing indications (e.g., audible and/or visual indications) to a user and/or for receiving user input (e.g., upon user actuation of a sensing device such as a keypad, a touch screen, a microphone, and so on). Although not shown, the base station 304 and the network entity 306 may also include user interfaces.

Referring to the processing system 384 in more detail, in the downlink, IP packets from the network entity 306 may be provided to the processing system 384. The processing system 384 may implement functionality for an RRC layer, a packet data convergence protocol (PDCP) layer, a radio link control (RLC) layer, and a medium access control (MAC) layer. The processing system 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the processing system 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the processing system 332, which implements Layer-3 and Layer-2 functionality.

In the UL, the processing system 332 provides demultiplexing between transport and logical channels, packet reassembly, deciphering, header decompression, and control signal processing to recover IP packets from the core network. The processing system 332 is also responsible for error detection.

Similar to the functionality described in connection with the DL transmission by the base station 304, the processing system 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARQ), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The UL transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the processing system 384.

In the UL, the processing system 384 provides demultiplexing between transport and logical channels, packet reassembly, deciphering, header decompression, control signal processing to recover IP packets from the UE 302. IP packets from the processing system 384 may be provided to the core network. The processing system 384 is also responsible for error detection.

For convenience, the UE 302, the base station 304, and/or the network entity 306 are shown in FIGS. 3A-C as including various components that may be configured according to the various examples described herein. It will be appreciated, however, that the illustrated blocks may have different functionality in different designs.

The various components of the UE 302, the base station 304, and the network entity 306 may communicate with each other over data buses 334, 382, and 392, respectively. The components of FIGS. 3A-C may be implemented in various ways. In some implementations, the components of FIGS. 3A-C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a positioning entity," etc. However, as will be appreciated, such operations, acts, and/or functions may actually be performed by specific components or combinations of components of the UE, base station, positioning entity, etc., such as the processing systems 332, 384, 394, the transceivers 310, 320, 350, and 360, the memory components 340, 386, and 396, the SP SRS-for-positioning module 342, 388, and 398, etc.

Figure 4A:
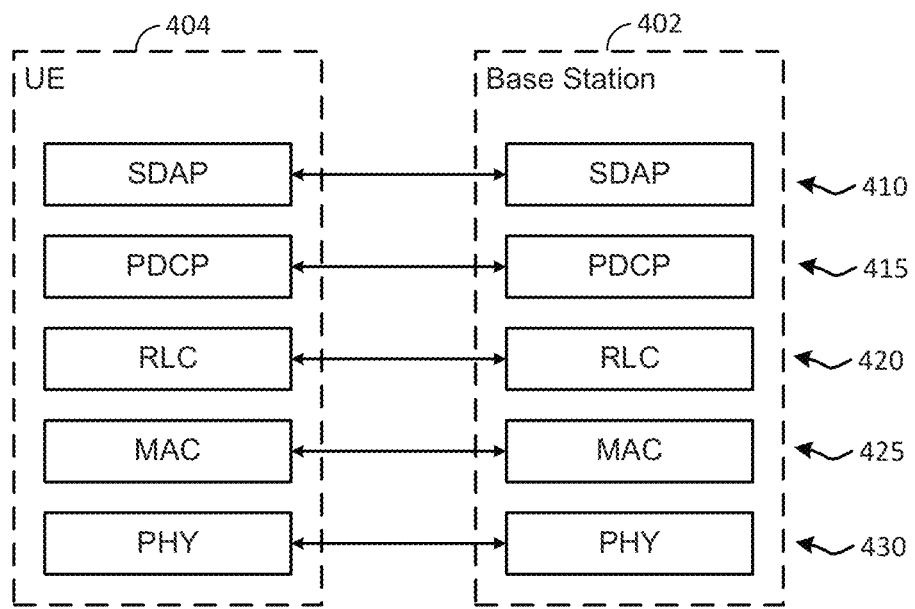
FIGS. 4A and 4B illustrate user plane and control plane protocol stacks, according to aspects of the disclosure.

Referring to FIG. 4A, a user plane protocol stack is shown. As illustrated in FIG. 4A, a UE 404 and a base station 402 (which may correspond to any of the UEs and base stations, respectively, described herein) implement, from highest layer to lowest, a service data adaptation protocol (SDAP) layer 410, a PDCP layer 415, an RLC layer 420, a MAC layer 425, and a PHY layer 430. As illustrated by the double-arrow lines in FIG. 4A, each layer of the protocol stack implemented by the UE 404 communicates with the same layer of the base station 402, and vice versa. Collectively, the SDAP layer 410, the PDCP layer 415, the RLC layer 420, and the MAC layer 425 are referred to as "Layer 2" or "L2."

Figure 4B:
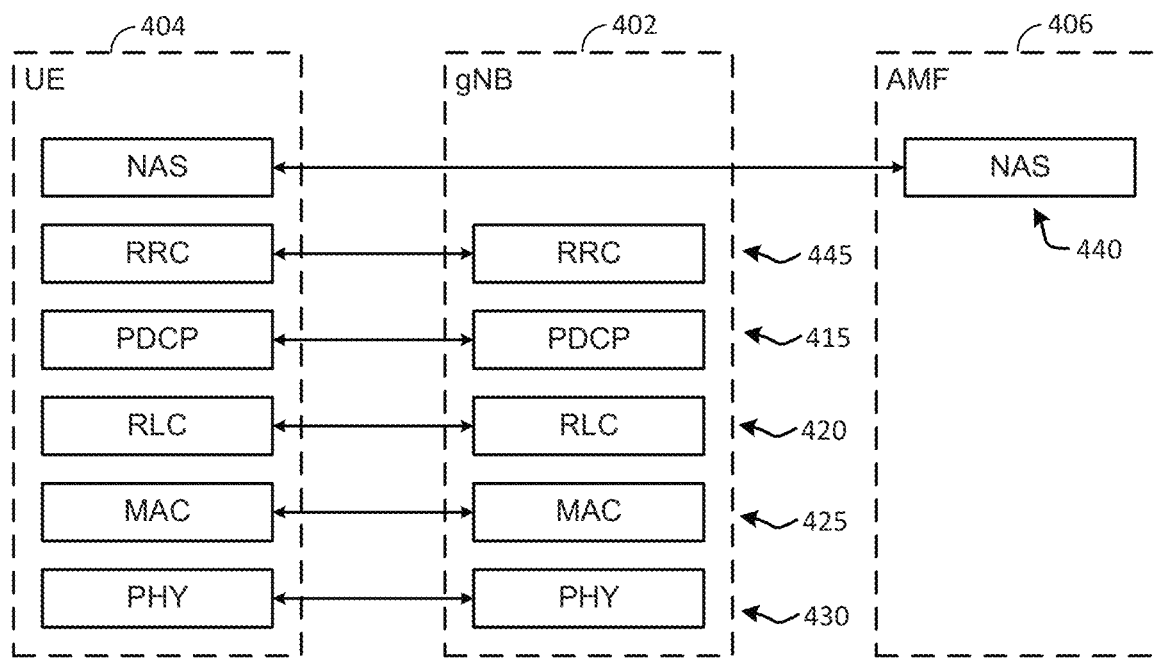

Referring to FIG. 4B, a control plane protocol stack is shown. In addition to the PDCP layer 415, the RLC layer 420, the MAC layer 425, and the PHY layer 430, the UE 404 and the base station 402 also implement an RRC layer 445. Further, the UE 404 and an AMF 406 (e.g., AMF 264) implement a NAS layer 440.

The main services and functions of the RLC layer 420 depend on the transmission mode and include transfer of upper layer PDUs, sequence numbering independent of the one in the PDCP layer 415, error correction through ARQ, segmentation and re-segmentation, reassembly of service data units (SDUs), RLC SDU discard, and RLC re-establishment. The ARQ functionality provides error correction in AM mode, and has the following characteristics: ARQ retransmits RLC PDUs or RLC PDU segments based on RLC status reports, polling for an RLC status report is used when needed by RLC, and the RLC receiver can also trigger an RLC status report after detecting a missing RLC PDU or RLC PDU segment.

The main services and functions of the PDCP layer 415 for the user plane include sequence numbering, header compression and decompression (for robust header compression (ROHC) only), transfer of user data, reordering and duplicate detection (if in-order delivery to layers above the PDCP layer 415 is required), PDCP PDU routing (in case of split bearers), retransmission of PDCP SDUs, ciphering and deciphering, PDCP SDU discard, PDCP re-establishment and data recovery for RLC AM, and duplication of PDCP PDUs. The main services and functions of the PDCP layer 415 for the control plane include ciphering, deciphering, and integrity protection, transfer of control plane data, and duplication of PDCP PDUs.

The SDAP layer 410 is an access stratum (AS) layer, the main services and functions of which include mapping between a QoS flow and a data radio bearer and marking QoS flow ID in both DL and UL packets. A single protocol entity of SDAP is configured for each individual PDU session.

The main services and functions of the RRC layer 445 include broadcast of system information related to AS and NAS, paging initiated by the 5GC (e.g., NGC 210 or 260) or RAN (e.g., New RAN 220), establishment, maintenance, and release of an RRC connection between the UE and RAN, security functions including key management, establishment, configuration, maintenance, and release of signaling radio bearers (SRBs) and data radio bearers (DRBs), mobility functions (including handover, UE cell selection and reselection and control of cell selection and reselection, context transfer at handover), QoS management functions, UE measurement reporting and control of the reporting, and NAS message transfer to/from the NAS from/to the UE.

The NAS layer 440 is the highest stratum of the control plane between the UE 404 and the AMF 406 at the radio interface. The main functions of the protocols that are part of the NAS layer 440 are the support of mobility of the UE 404 and the support of session management procedures to establish and maintain IP connectivity between the UE 404 and a packet data network. The NAS layer 440 performs EPS bearer management, authentication, EPS connection management (ECM)-IDLE mobility handling, paging origination in ECM-IDLE, and security control.

Figure 5A:
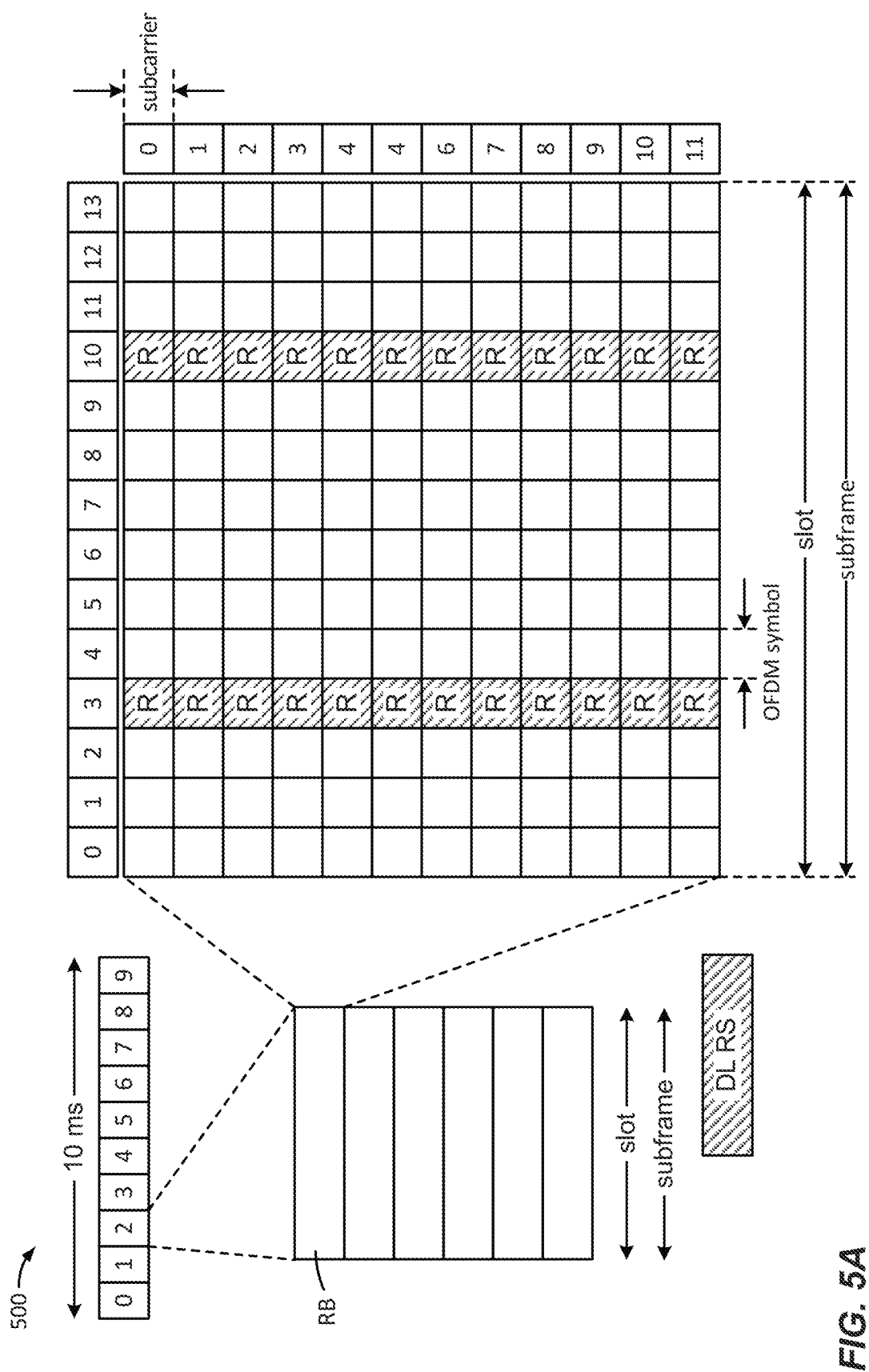
FIGS. 5A to 5D are diagrams illustrating example frame structures and channels within the frame structures, according to aspects of the disclosure.
Figure 5B:
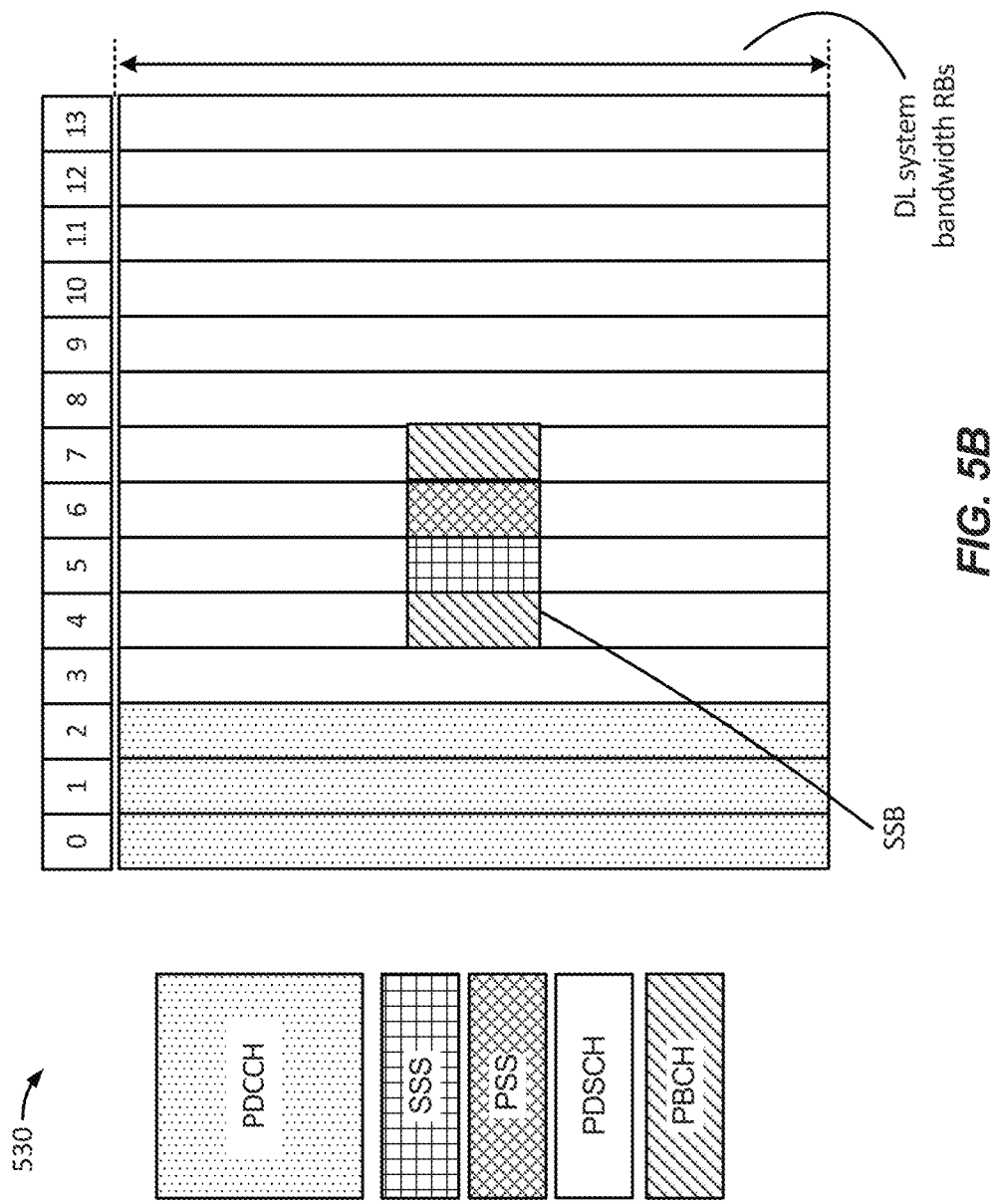
Figure 5C:
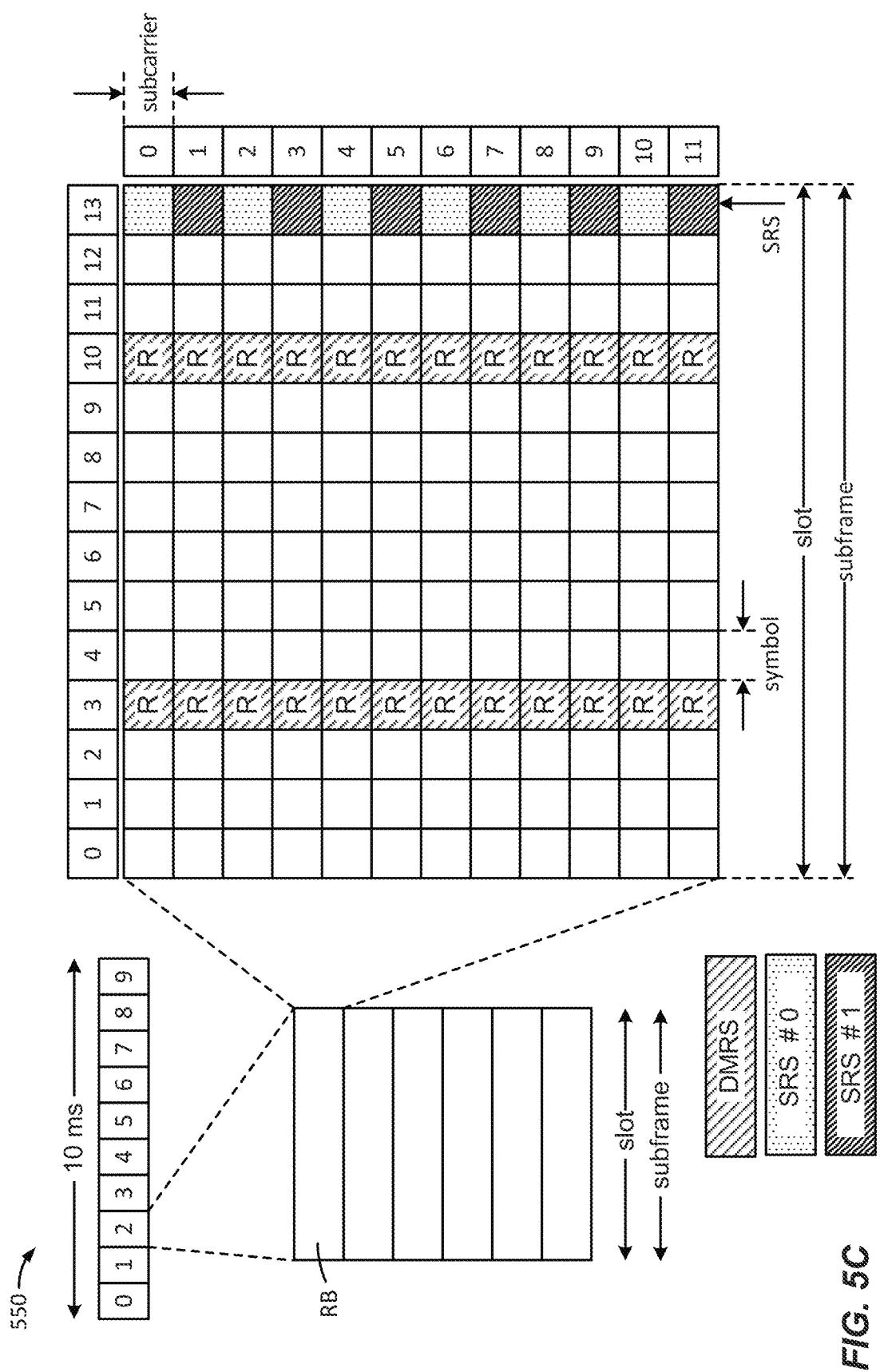
Figure 5D:
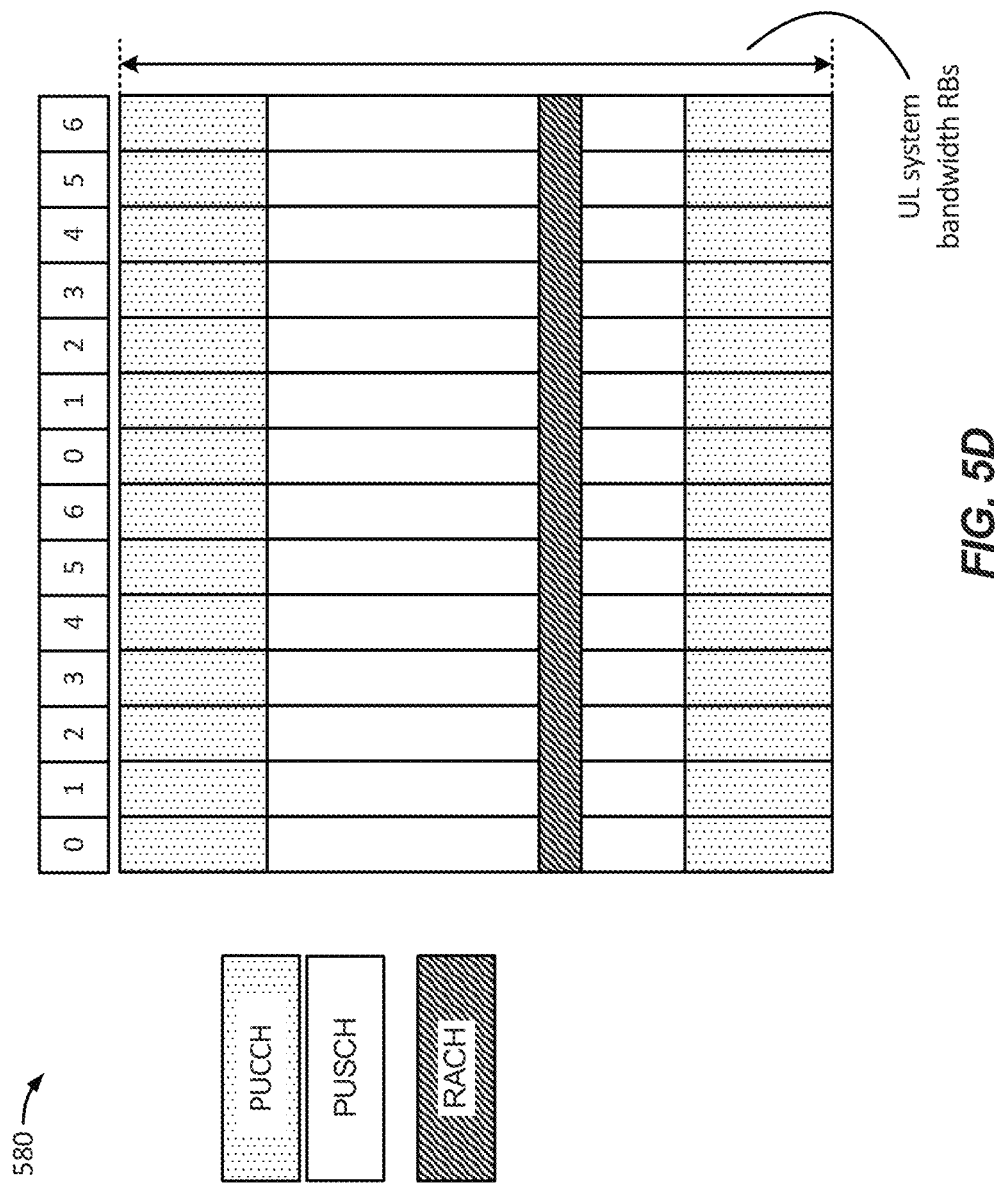

Various frame structures may be used to support downlink and uplink transmissions between network nodes (e.g., base stations and UEs). Referring to FIG. 5A, a diagram 500 illustrating an example of a DL frame structure is shown. FIG. 5B is a diagram 530 illustrating an example of channels within the DL frame structure. FIG. 5C is a diagram 550 illustrating an example of an uplink frame structure. FIG. 5D is a diagram 580 illustrating an example of channels within an uplink frame structure. Other wireless communications technologies may have a different frame structures and/or different channels.

LTE, and in some cases NR, utilizes OFDM on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (resource block) may be 12 subcarriers (or 180 kHz). Consequently, the nominal FFT size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

LTE supports a single numerology (subcarrier spacing, symbol length, etc.). In contrast, NR may support multiple numerologies, for example, subcarrier spacing of 15 kHz, 30 kHz, 60 kHz, 120 kHz and 204 kHz or greater may be available. Table 1 provided below lists some various parameters for different NR numerologies.

TABLE 1

| Subcarrier spacing (kHz) | Symbols/ slot | slots/ subframe | slots/ frame | slot (ms) | Symbol duration (μs) | Max. nominal system BW (MHz) with 4K FFT size |
|---|---|---|---|---|---|---|
| 15 | 14 | 1 | 10 | 1 | 66.7 | 50 |
| 30 | 14 | 2 | 20 | 0.5 | 33.3 | 100 |
| 60 | 14 | 4 | 40 | 0.25 | 16.7 | 100 |
| 120 | 14 | 8 | 80 | 0.125 | 8.33 | 400 |
| 204 | 14 | 16 | 160 | 0.0625 | 4.17 | 800 |

In the example of FIGS. 5A to 5D, a numerology of 15 kHz is used. Thus, in the time domain, a frame (e.g., 10 ms) is divided into 10 equally sized subframes of 1 ms each, and each subframe includes one time slot. In FIGS. 5A to 5D, time is represented horizontally (e.g., on the X axis) with time increasing from left to right, while frequency is represented vertically (e.g., on the Y axis) with frequency increasing (or decreasing) from bottom to top.

A resource grid may be used to represent time slots, each time slot including one or more time concurrent resource blocks (RBs) (also referred to as physical RBs (PRBs)) in the frequency domain. The resource grid is further divided into multiple resource elements (REs). An RE may correspond to one symbol length in the time domain and one subcarrier in the frequency domain. In the numerology of FIGS. 5A to 5D, for a normal cyclic prefix, an RB may contain 12 consecutive subcarriers in the frequency domain and seven consecutive symbols in the time domain, for a total of 84 REs. For an extended cyclic prefix, an RB may contain 12 consecutive subcarriers in the frequency domain and six consecutive symbols in the time domain, for a total of 72 REs. The number of bits carried by each RE depends on the modulation scheme.

As illustrated in FIG. 5A, some of the REs carry downlink reference (pilot) signals (DL-RS) for channel estimation at the UE. The DL-RS may include demodulation reference signals (DMRS), channel state information reference signals (CSI-RS), cell-specific reference signals (CRS), positioning reference signals (PRS), navigation reference signals (NRS), tracking reference signals (TRS), etc., exemplary locations of which are labeled "R" in FIG. 5A.

FIG. 5B illustrates an example of various channels within a downlink subframe of a frame. The physical downlink control channel (PDCCH) carries downlink control information (DCI) within one or more control channel elements (CCEs), each CCE including nine RE groups (REGs), each REG including four consecutive REs in an OFDM symbol.

The DCI carries information about uplink resource allocation (persistent and non-persistent) and descriptions about downlink data transmitted to the UE. Multiple (e.g., up to eight) DCIs can be configured in the PDCCH, and these DCIs can have one of multiple formats. For example, there are different DCI formats for uplink scheduling, for non-MIMO downlink scheduling, for MIMO downlink scheduling, and for uplink power control.

A primary synchronization signal (PSS) is used by a UE to determine subframe/symbol timing and a physical layer identity. A secondary synchronization signal (SSS) is used by a UE to determine a physical layer cell identity group number and radio frame timing. Based on the physical layer identity and the physical layer cell identity group number, the UE can determine a PCI. Based on the PCI, the UE can determine the locations of the aforementioned DL-RS. The physical broadcast channel (PBCH), which carries an MIB, may be logically grouped with the PSS and SSS to form an SSB (also referred to as an SS/PBCH). The MIB provides a number of RBs in the downlink system bandwidth and a system frame number (SFN). The physical downlink shared channel (PDSCH) carries user data, broadcast system information not transmitted through the PBCH such as system information blocks (SIBs), and paging messages.

A collection of resource elements that are used for transmission of PRS is referred to as a "PRS resource," and may be identified by the parameter DL-PRS-ResourceId. The collection of resource elements (REs) can span multiple PRBs in the frequency domain and N (e.g., 1 or more) consecutive symbol(s) within a slot in the time domain. In a given OFDM symbol in the time domain, a PRS resource occupies consecutive PRBs in the frequency domain.

A "PRS resource set" is a set of PRS resources used for the transmission of PRS signals, where each PRS resource has a PRS resource ID (DL-PRS-ResourceId). In addition, the PRS resources in a PRS resource set are associated with the same TRP. A PRS resource set is identified by a PRS resource set ID (DL-PRS-ResourceSetId) and is associated with a particular TRP (identified by a cell ID). In addition, the PRS resources in a PRS resource set have the same periodicity, a common muting pattern configuration, and the same repetition factor across slots. The periodicity may have a length selected from $2^m \cdot \{4, 5, 8, 10, 16, 20, 32, 40, 64, 80, 160, 320, 640, 1280, 2560, 5120, 10240\}$ slots, with μ=0, 1, 2, 3. The repetition factor may have a length selected from {1, 2, 4, 6, 8, 16, 32} slots.

A PRS resource ID in a PRS resource set is associated with a single beam (and/or beam ID) transmitted from a single TRP (where a TRP may transmit one or more beams). That is, each PRS resource of a PRS resource set may be transmitted on a different beam, and as such, a "PRS resource," or simply "resource," can also be referred to as a "beam." Note that this does not have any implications on whether the TRPs and the beams on which PRS are transmitted are known to the UE.

A "PRS instance" or "PRS occasion" is one instance of a periodically repeated time window (e.g., a group of one or more consecutive slots) where PRS are expected to be transmitted. A PRS occasion may also be referred to as a "PRS positioning occasion," a "PRS positioning instance, a "positioning occasion," "a positioning instance," or simply an "occasion" or "instance."

A "positioning frequency layer" is a collection of one or more PRS resource sets across one or more TRPs that have the same subcarrier spacing (SCS) and cyclic prefix (CP) type (meaning all numerologies supported for the PDSCH are also supported for PRS), the same Point A, the same value of the downlink PRS bandwidth, the same start PRB (and center frequency), and the same value of comb-size. The Point A parameter takes the value of the parameter ARFCN-ValueNR, where "ARFCN" stands for "absolute radio-frequency channel number," and is an identifier/code that specifies a pair of physical radio channel used for transmission and reception. The downlink PRS bandwidth may have a granularity of four PRBs, with a minimum of 24 PRBs and a maximum of 272 PRBs. The comb size indicates the number of subcarriers in each symbol carrying PRS. For example, a comb-size of comb-4 means that every fourth subcarrier of a given symbol carries PRS. Currently, up to four frequency layers have been defined, and up to two PRS resource sets may be configured per TRP per frequency layer.

DL PRS resource IDs are locally defined within a DL PRS resource set, and DL PRS resource set IDs are locally defined within a TRP. To uniquely identify a DL-PRS resource across TRPs, an ID has been defined that can be associated with multiple DL PRS resource sets associated with a single TRP. This ID can be used along with a DL PRS resource set ID and a DL PRS resource ID to uniquely identify a single DL PRS resource. This ID is referred to herein as DL-PRS-TRP-ResourceSetId. Each TRP should only be associated with one DL-PRS-TRP-ResourceSetId. For example, a DL-PRS-TRP-ResourceSetId may be a cell ID (e.g., PCI, VCI), or a TRP ID, or another identifier that is different than the cell ID or the TRP ID that is used for positioning purposes to participate in the unique identification of a PRS resource.

As illustrated in FIG. 5C, some of the REs carry demodulation reference signals (DMRS) for channel estimation at the base station. The UE may additionally transmit sounding reference signals (SRS) in, for example, the last symbol of a subframe. The SRS may have a comb structure, and a UE may transmit SRS on one of the combs. The comb structure (also referred to as the "comb size") indicates the number of subcarriers in each symbol period carrying a reference signal (here, SRS). For example, a comb size of comb-4 means that every fourth subcarrier of a given symbol carries the reference signal, whereas a comb size of comb-2 means that every second subcarrier of a given symbol carries the reference signal. In the example of FIG. 5C, the illustrated SRS are both comb-2. The SRS may be used by a base station to obtain the channel state information (CSI) for each UE. CSI describes how an RF signal propagates from the UE to the base station and represents the combined effect of scattering, fading, and power decay with distance. The system uses the SRS for resource scheduling, link adaptation, massive MIMO, beam management, etc.

FIG. 5D illustrates an example of various channels within an UL subframe of a frame. A random access channel (RACH), also referred to as a physical random access channel (PRACH), may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

A collection of resource elements that are used for transmission of SRS is referred to as an "SRS resource," and may be identified by the parameter SRS-ResourceId. The collection of resource elements can span multiple PRBs in the frequency domain and N (e.g., one or more) consecutive symbol(s) within a slot in the time domain. In a given OFDM symbol, an SRS resource occupies consecutive PRBs. An "SRS resource set" is a set of SRS resources used for the transmission of SRS signals, and is identified by an SRS resource set ID (SRS-ResourceSetId).

Generally, a UE transmits SRS to enable the receiving base station (either the serving base station or a neighboring base station) to measure the channel quality between the UE and the base station. However, SRS can also be used as uplink positioning reference signals for uplink positioning procedures, such as uplink time-difference of arrival (UT-DOA), multi-round-trip-time (multi-RTT), angle-of-arrival (AoA), etc.

Several enhancements over the previous definition of SRS have been proposed for SRS-for-positioning, such as a new staggered pattern within an SRS resource (except for single-symbol/comb-2), a new comb type for SRS, new sequences for SRS, a higher number of SRS resource sets per component carrier, and a higher number of SRS resources per component carrier. In addition, the parameters SpatialRelationInfo and PathLossReference are to be configured based on a downlink reference signal or SSB from a neighboring TRP. Further still, one SRS resource may be transmitted outside the active bandwidth part (BWP), and one SRS resource may span across multiple component carriers. Also, SRS may be configured in RRC connected state and only transmitted within an active BWP. Further, there may be no frequency hopping, no repetition factor, a single antenna port, and new lengths for SRS (e.g., 8 and 12 symbols). There may also be open-loop power control and not closed-loop power control, and comb-8 (i.e., an SRS transmitted every eighth subcarrier in the same symbol) may be used. Lastly, the UE may transmit through the same transmit beam from multiple SRS resources for UL-AoA. All of these are features that are additional to the current SRS framework, which is configured through RRC higher layer signaling (and potentially triggered or activated through MAC control element (CE) or DCI). Note that BWP is a contiguous set of PRBs in the frequency domain selected from a contiguous subset of the common resource blocks for a given numerology on a given carrier.

SRS-for-positioning may support a semi-persistent (SP) configuration with MAC CE activation and/or deactivation. In contrast, aperiodic SRS-for-positioning are triggered by DCI.

For SRS-for-positioning, if the SpatialRelationInfo or PathLossReference parameters for an SRS indicate a downlink positioning reference signal (DL-PRS), the following parameters of the DL-PRS are provided in the UL-SRS-for-positioning configuration: (1) the identifier (ID) that can be associated with multiple DL PRS resource sets associated with a single TRP, (2) DL-PRS-ResourceSetId, and (3) DL-PRS-ResourceId. If the SpatialRelationInfo parameter indicates an SRS resource, the following parameters for the SRS-for-positioning can be provided: (1) SRS-ResourceId, (2) uplink BWP ID, and (3) serving cell ID.

The maximum number of supported SRS-for-positioning resource sets depends on the capabilities of a UE, and may be up to 16 SRS resource sets per BWP. Currently, the values for the UE capability include {1, 16}, meaning a UE can either support one SRS resource set per BWP or 16 SRS resource sets per BWP.

As noted above, the configuration of aperiodic SRS-for-positioning may occur via RRC, as defined in 3GPP technical specification (TS) 38.331, which is incorporated herein by reference in its entirety. An SRS configuration is defined per BWP, as illustrated in FIG. 6A. Specifically, the BWP-UplinkDedicated information element (IE) includes an srs-Config parameter pointing to a particular srs-Config IE. Inside an srs-Config IE, SRS resource sets and/or SRS resources are configured as illustrated in FIG. 6B. Specifically, the srs-Config IE includes an srs-ResourceID parameter and a spatialRelationInfo parameter (which points to an SRS-SpatialRelationInfo IE).

As noted above, the network may activate and deactivate configured SP SRS resource sets of a serving cell by sending an SP SRS activation/deactivation MAC CE. If the MAC entity (e.g., MAC layer 425) receives an SP SRS activation/deactivation MAC CE on a serving cell, it is to indicate to lower layers the information regarding the SP SRS activation/deactivation MAC CE. The configured SP SRS resource sets are initially deactivated upon configuration and after a handover.

An SP SRS activation/deactivation MAC CE is identified by a MAC subheader with a logical channel identifier (LCID). The LCID identifies the logical channel instance of the corresponding MAC SDU or the type of the corresponding MAC CE or padding for the downlink shared channel (DL-SCH) and the uplink shared channel (UL-SCH), respectively. There is one LCID field per MAC subheader.

Figure 7:
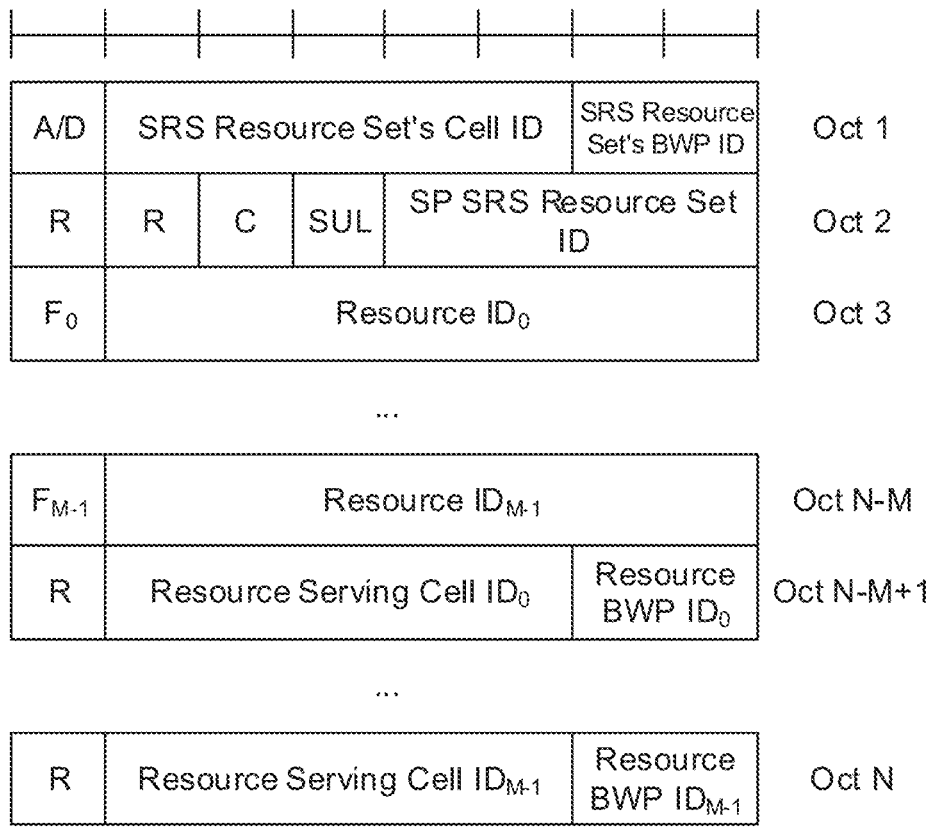
FIG. 7 illustrates various fields of a semi-persistent (SP) SRS activation/deactivation medium access control control element (MAC CE).

Referring to FIG. 7, various fields of an SP SRS activation/deactivation MAC CE 700 are shown. An A/D field indicates whether to activate or deactivate an indicated SP SRS resource set. The field may be set to '1' to indicate activation, otherwise it indicates deactivation. The purpose of this field is simply to activate or deactivate an SP SRS resource set.

An SRS resource set's cell ID field indicates the identity of the serving cell, which contains the activated/deactivated SP SRS resource set. If the C field of the MAC CE is set to '0,' this field also indicates the identity of the serving cell that contains all resources indicated by the resource ID, fields. The purpose of this field is to identify the component carrier of the SP SRS. This field/value is generally needed because the SRS resource sets IDs are unique within the context of a BWP of a component carrier, that is, within a list of {cell ID, BWP ID, resource set ID}. The length of this field is five bits.

An SRS resource set's BWP ID field indicates an uplink BWP as the code point of the DCI bandwidth part indicator field as specified in 3GPP TS 38.212 (which is incorporated herein by reference in its entirety), which contains the activated/deactivated SP SRS resource set. If the C field is set to '0,' this field also indicates the identity of the BWP that contains all resources indicated by the resource ID, fields. The purpose of this field is to identify the component carrier of the SP SRS. This field/value is generally needed because the SRS resource sets IDs are unique within the context of a BWP of a component carrier, that is, within a list of {cell ID, BWP ID, resource set ID}. The length of this field is two bits.

A "C" field indicates whether the octets containing the resource serving cell ID field(s) and resource BWP ID field(s) are present. If this field is set to '1,' the octets containing the resource serving cell ID field(s) and resource BWP ID field(s) are present, otherwise, they are not present.

An SUL field indicates whether the MAC CE applies to the normal uplink (NUL) carrier or supplemental uplink (SUL) carrier configuration. This field may be set to '1' to indicate that it applies to the SUL carrier configuration, and may be set to '0' to indicate that it applies to the NUL carrier configuration. That is, this field is an indicator that the SRS that is being activated or deactivated is in the SUL carrier.

An SP SRS resource set ID field indicates the SP SRS resource set ID identified by SRS-ResourceSetId that is to be activated or deactivated. The length of this field is four bits.

An "$F_i$" field indicates the type of resource used as a spatial relationship for an SRS resource within the SP SRS resource set indicated by the SP SRS resource set ID field. $F_0$ refers to the first SRS resource within the resource set, $F_1$ to the second one, and so on. The field can be set to '1' to indicate that a non-zero power (NZP) CSI-RS resource index is used, and can be is set to '0' to indicate that either an SSB index or an SRS resource index is used. The length of the field is one bit. This field is only present if the MAC CE is used for activation, that is, the A/D field is set to '1.'

A resource ID field contains an identifier of the resource used for spatial relationship determination for SRS resource i. Resource $ID_0$ refers to the first SRS resource within the resource set, resource $ID_1$ refers to the second, one and so on. If $F_1$ is set to '0,' and the first bit of this field is set to '1,' the remainder of this field contains the value of SSB-Index as specified in 3GPP TS 38.331. If $F_i$ is set to '0,' and the first bit of this field is set to '0,' the remainder of this field contains the value of SRS-ResourceId as specified in 3GPP TS 38.331. The length of the field is seven bits. This field is only present if the MAC CE is used for activation, that is, the A/D field is set to '1.'

A resource serving cell $ID_i$ field indicates the identity of the serving cell on which the resource used for spatial relationship determination for SRS resource i is located. That is, this field indicates the component carrier ID of the SRS or CSI-RS used for the spatial relation. The length of the field is five bits.

A resource BWP $ID_i$ field indicates an uplink BWP as the code point of the DCI bandwidth part indicator field, as specified in 3GPP TS 38.212, on which the resource used for spatial relationship determination for SRS resource i is located. That is, this field indicates the BWP ID of the SRS used for spatial relation. The length of this field is two bits.

An "R" field is for a reserved bit, and is currently always set to '0.'

The present disclosure provides techniques to determine a path loss (i.e., PathLossReference) for semi-persistent SRS-for-positioning if the path loss resource set is not updatable through a MAC CE. A SRS resource sets may be configured in RRC (i.e., SRS-Config in FIG. 6B), with each set including the parameters SpatialRelationInfo and PathLossReference. Each SRS resource set has a different spatial relation (e.g., RS1, RS2, etc.) which may subsequently update through a MAC CE command. Currently, the PathLossReference parameter cannot be updated through a MAC CE command. Since the path loss reference is associated with a whole resource set, the techniques provided herein enable a UE to pick one of the spatial relation resources as a path loss reference because the spatial relation resources are configured for each resource separately. In one example, the path loss reference may be set to a spatial relation reference of the first SRS resource of the set. If the first SRS resource is an UL reference signal (RS), then a RS resource from the SS/PBCH block the UE uses to obtain a MIB may be used as the path loss reference. In an example, the path loss reference may be the spatial relation reference of the first SRS resource of the set that has a DL RS as a spatial relation reference. In another example, a spatial relation RS of a configured index of an SRS resource set may be used as the path loss reference for the whole set.

Figure 8:
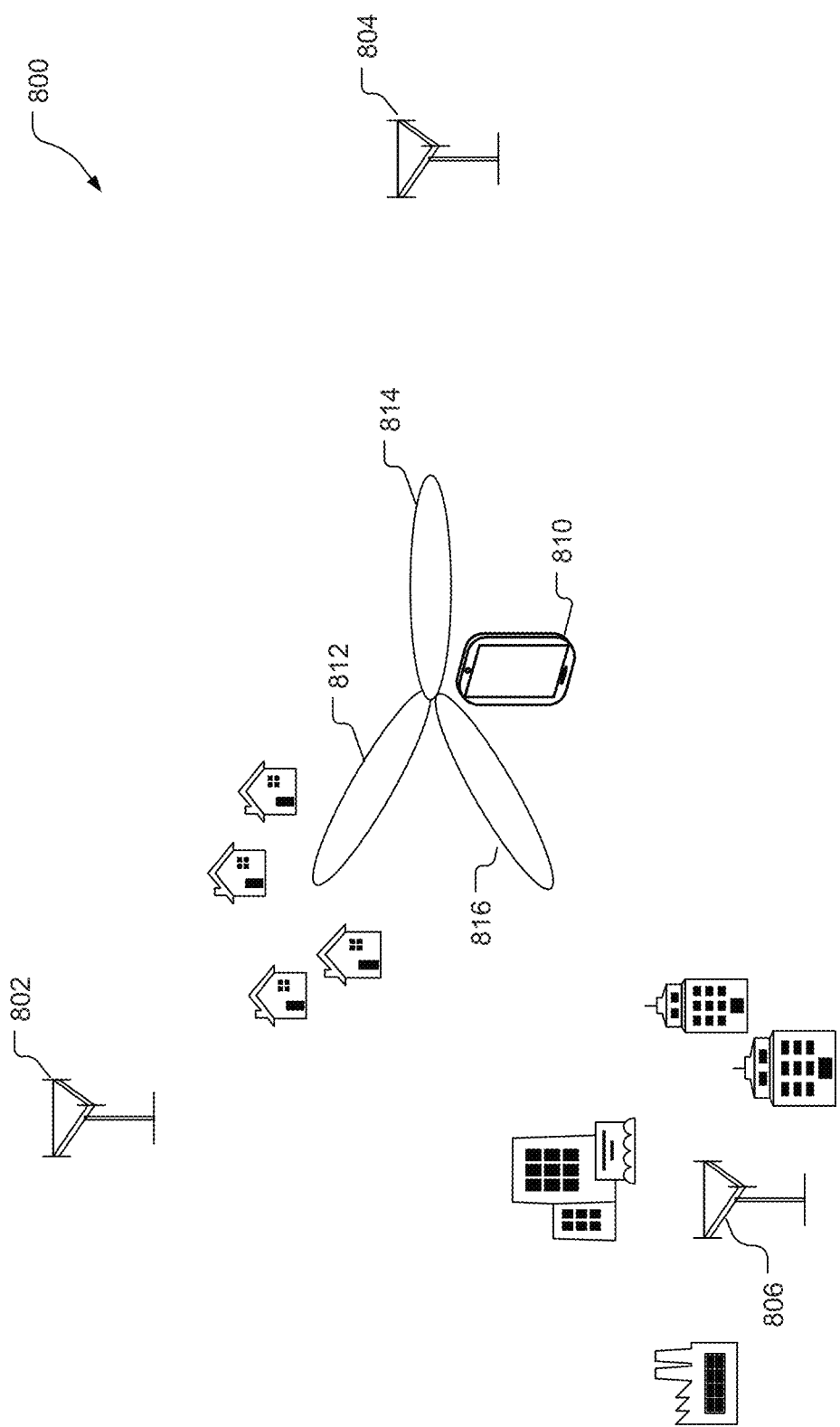
FIG. 8 illustrates example of SRS beams with different path losses.

Referring to FIG. 8, with further reference to FIGS. 1-7, an illustration of example SRS beams with different path losses is shown. A network 800 is an example of a wireless communication system 100 and includes a first TRP 802, a second TRP 804 and a third TRP 806. A UE 810 is an example of the UE 302 and is shown transmitting towards the three TRPs 802, 804, 806 with three respective beams including a first beam 812, a second beam 814, and a third beam 816. The first TRP 802 may be performing as a serving cell for the UE 810 and capable of providing RRC commands to configure the UE 810 for semi-persistent (SP) SRS-for-positioning. For example, the UE 810 may be configured with one or several SRS resource sets, where each resource set includes one or several configured SRS. The UE 810 may be configured with multiple SRS resource sets which may be used for different operations, such as uplink and downlink beam management and antenna array precoding.

The beams 812, 814, 816 may experience different path losses due to natural as well as manmade interference. For example, the first beam 812 may experience a moderate degradation due to attenuation and the presence of residential structures and the corresponding reflection, diffraction and scattering of the transmitted RF energy. The second beam 814 may be in line-of-sight of the second TRP 804 and hence path loss is based only on distance based attenuation. The third beam 816 may experience significant reflection, diffraction and scattering due to the proximity of the third TRP 806 to larger buildings. Other operational and environmental features, such as device density and the presence of interfering signals, may also impact the path loss.

In semi-persistent SRS-for-positioning, the UE 810 may be configured to transmit SRSs to desired TRPs based on a MAC CE received from the serving cell. The MAC CE may be used to activate or deactivate specific resource set (e.g., SRS-ResourceSetId) and identify the resource to use for the spatial relationship derivation (e.g., Resource $ID_i$). The $F_i$ value in the MAC CE may be used to indicate that the spatial relationship may be based on the SSB-Index or the SRS-ResourceId as previously described. The MAC CE may be used to change an active SRS-for-positioning beam, however, the MAC CE does not include a parameter to associate a path loss for the new beam. In operation, the MAC CE may be used to quickly change the SRS beams on the UE 810 based on reference signals to point to multiple different transmission points (e.g., the reference signal information is associated with the TRPs 802, 806, 808). The issue with quickly changing the SRS beams with MAC CE commands is that the UE 810 does not have information to change the path loss and the associated transmit power level for each of the new beams. For example, since a moderate level of path loss is experienced with the first beam 812, the transmit power level for the first beam 812 may be in the middle of the power output range. The middle level power output may be more than is necessary for the second beam 814 which experiences a relatively lower amount of path loss to the second TRP 804. In this example, if the UE 810 sets its transmit power based on the path loss value associated with the first TRP 802, that transmit power may be too high for the second beam 804. The additional power is unneeded and thus wastes power and/or generates unnecessary interference. Similarly, the third beam 816 has a relatively higher path loss and thus may require an increase in transmit power. Utilizing the mid power level (i.e., based on the communication with the first TRP 802) may be insufficient to send a SRS-for-positioning signal to the third TRP 806.

Figure 9:
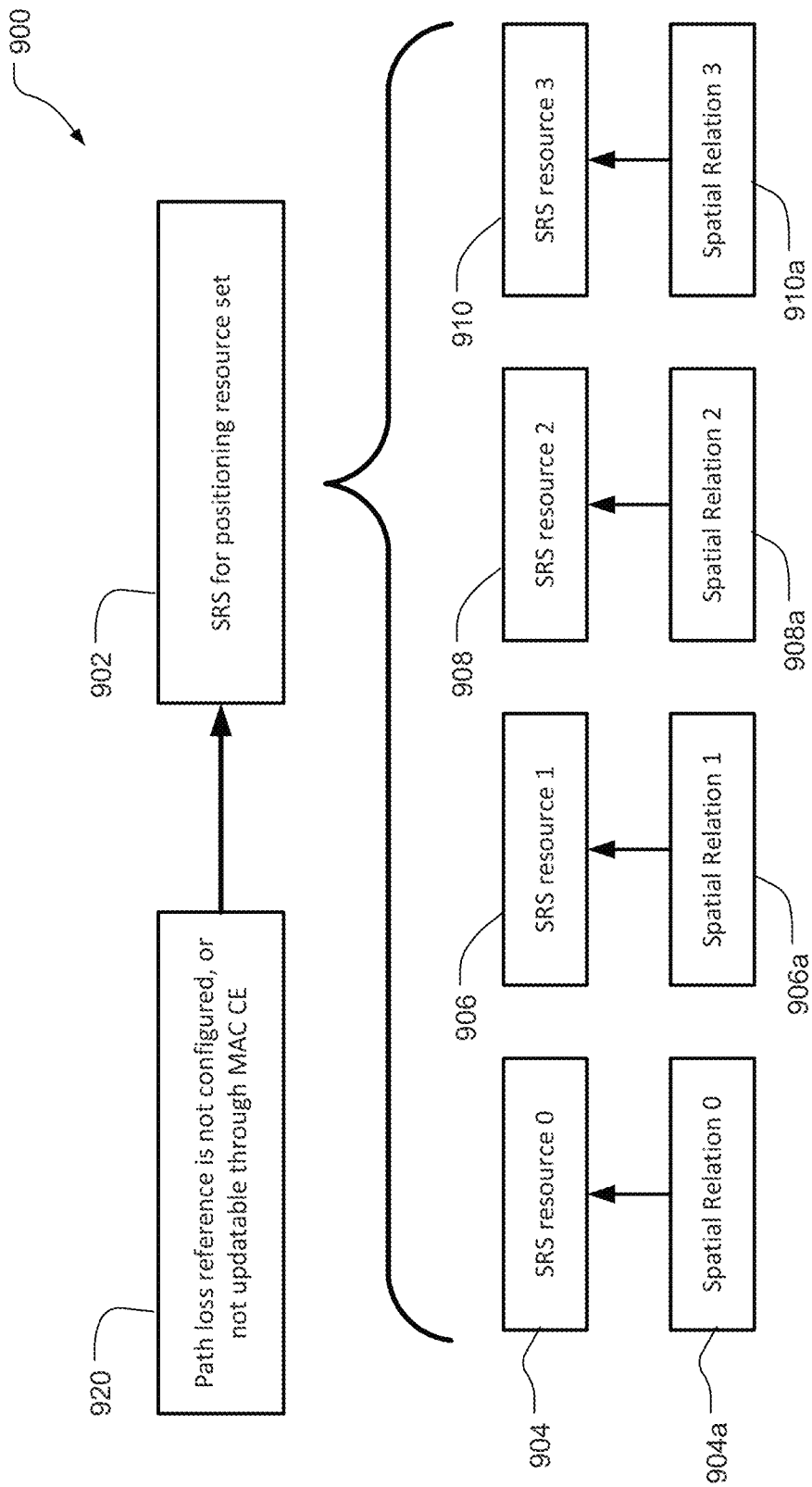
FIG. 9 is a block diagram of an example SRS resource set structure.

A path loss reference may be provided to the UE 810 in the RRC messages provided by the network 800. This path loss reference, however, is associated with the SRS resource set and not each resource individually. Referring to FIG. 9, a block diagram 900 including an example SRS resource set structure 902 is shown. An RRC message received by the UE 810 may include the SRS resource set 902 for positioning (e.g., as illustrated in FIG. 6B). The srs-Config information element includes an srs-ResourceID parameter and a spatialRelationInfo parameter which points to an SRS-SpatialRelationInfo information element. Thus, as depicted in FIG. 9, the SRS resource 0 904 is associated with spatial relation 0 element 904a. The SRS resource set 902 may include a plurality of SRS resources such as the SRS resource 1 906, the SRS resource 2 908, and the SRS resource 3 910. Each SRS resource 906, 908, 910 is associated with a respective spatial relation element 906a, 908a, 910a. A SRS-for-positioning event 920, in which a path loss reference is not configured or is not updated with a MAC CE command, may utilize the SRS resource set 902 to determine a path loss reference based on one or more of the spatial relation elements 904a, 906a, 908a, 910a in the SRS resource set. The spatial relation can be a DL RS from a neighbouring cell. For example, the spatial relation elements 904a, 906a, 908a, 910a are indexes to respective reference signals. The path loss element is an index to a reference signal. Thus, if a path-loss reference of a semi-persistent SRS (SP-SRS) for positioning is not updatable by a MAC CE command, then the path loss reference of the SRS resource set shall be the same reference signal as the spatial relation of the first SRS resource of the set. If the first SRS resource is unavailable, or a UL reference signal, then the path loss reference shall be set to a reference signal resource from the SS/PBCH block that the UE uses to obtain a master information block (MIB). Other methods may also utilize an index in a spatial relation element (or other elements) as the path loss reference.

Figure 10:
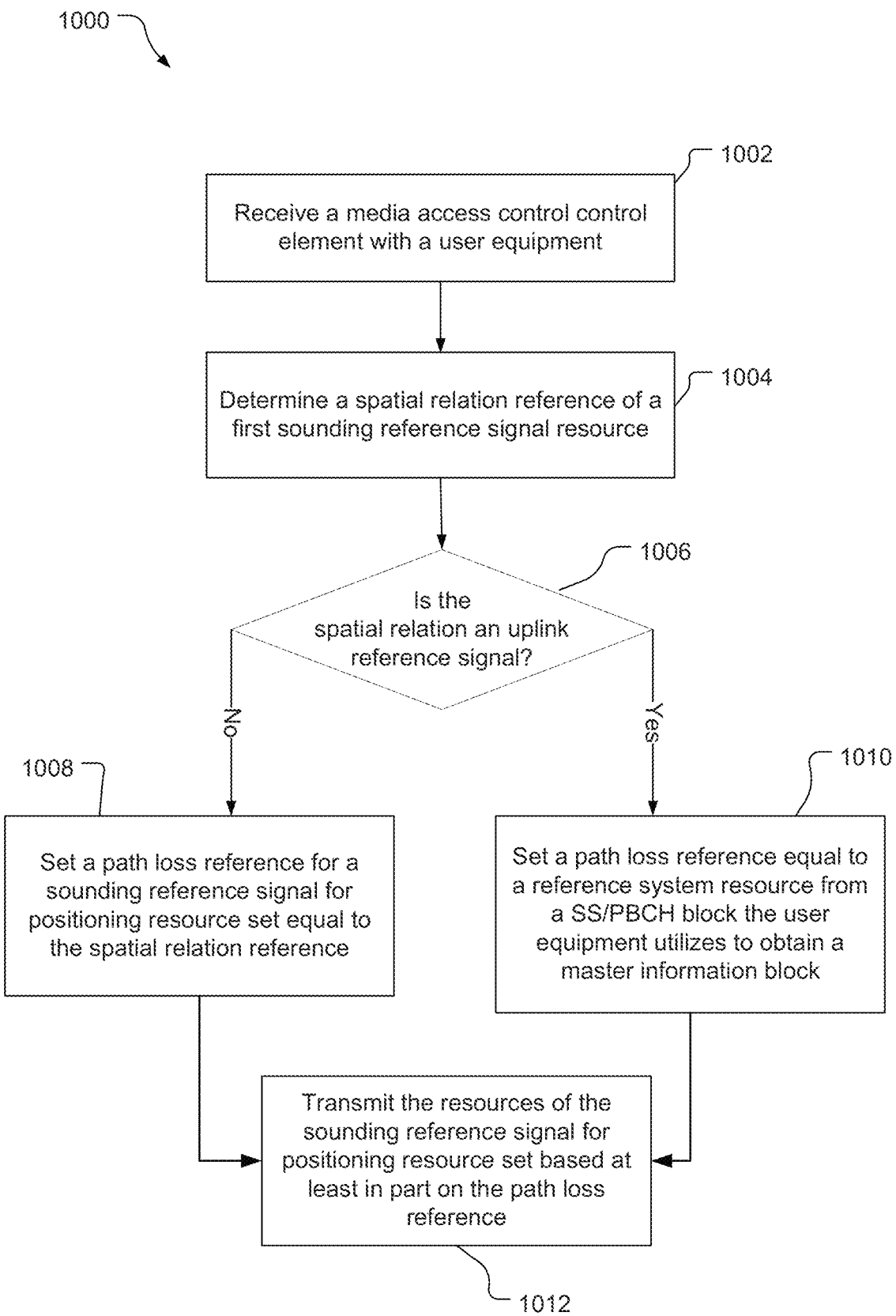
FIG. 10 is a process flow diagram of a first example method for transmitting a SP SRS-for-positioning based on a path-loss reference.

Referring to FIG. 10, with further reference to FIGS. 1-9, a first method 1000 for transmitting a SP SRS-for-positioning based on a path-loss reference includes the stages shown. The method 1000 is, however, an example only and not limiting. The method 1000 may be altered, e.g., by having stages added, removed, rearranged, combined, performed concurrently, and/or having single stages split into multiple stages. For example, one or more stages may occur before, and/or one or more stages may occur after, the stages shown in FIG. 10.

At stage 1002, the method includes receiving a Media Access Control Control Element (MAC CE) with a user equipment. The transceiver 310, processing system 332, memory 340, and/or SP SRS-for-positioning module 342, may be considered means for receiving the MAC CE. In an example, the MAC CE may be transmitted on the PDSCH. The MAC CE may indicate activation of a semi-persistent sounding reference signal (SP SRS)-for-positioning. In an example, a reserved bit (the "R" field) in the MAC CE or an LCID of a MAC subheader of the MAC CE indicates the activation or deactivation of the SP SRS-for-positioning. The MAC CE is also used to update the spatial relation reference information (e.g., 904a, 906a, 908a, 910a) of the SRS resource set 902.

At stage 1004, the method includes determining a spatial relation reference of a first sounding reference signal resource. The processing system 332, memory 340, and/or SP SRS-for-positioning module 342, may be considered means for determining the spatial relation reference. RRC signalling received by the user equipment may include the SRS resource set 902 for positioning. For example, the srs-Config information element includes an srs-ResourceID parameter and a spatialRelationInfo parameter which points to an SRS-SpatialRelationInfo information element. The SRS resource set 902 includes a first SRS resource 904 with a spatial relation 904a, which is the first SRS. In an example, the spatial relation (or the path loss reference) can be a DL RS from a neighbouring cell.

At stage 1006, the method includes determining if the spatial relation is an uplink reference signal. The processing system 332, memory 340, and/or SP SRS-for-positioning module 342, may be considered means for determining if the spatial relation reference is an uplink reference signal. Legacy SRS may be configured to enable uplink channel sounding. The legacy SRS are uplink reference signals transmitted by the UE and used for uplink channel state estimation at the base stations. If the spatial relation is an uplink reference signal (i.e., the SpatialRelationInfo indicates an uplink BWP ID), then at stage 1010 a path loss reference is set to a reference system resource from a SS/PBCH block the UE utilizes to obtain a MIB. For example, the user equipment may be using a SS block from a serving cell and can measure the path loss for the serving cell. The path loss used for the SS block may be used for the SRS-for-positioning path loss.

At stage 1008, if the spatial relation reference is not an uplink reference signal, the method includes setting a path loss reference for a sounding reference signal for positioning resource set equal to the spatial relation reference. The processing system 332, memory 340, and/or SP SRS-for-positioning module 342, may be considered means for setting the path loss reference. For example, the path loss reference (i.e., PathLossReference parameter) may be set to the SSB Index parameter in the SRS-SpatialRelationInfo IE. That is, the path loss reference is for the whole SRS resource set for positioning 902.

At stage 1012, the method includes transmitting the resources of the sounding reference signal for positioning resource set based at least in part on the path loss reference. The transceiver 310, processing system 332, memory 340, and/or SP SRS-for-positioning module 342, may be considered means for transmitting a sounding reference signal. The user equipment is configured to transmit the all the resources of the SP SRS-for-positioning resource set 902 configured via the MAC CE. All of the SP SRS-for-positioning having transmission parameters adopted from the spatial relation reference signal and the path loss reference determined at stage 1008 or stage 1010. In an example, the power level of the transmission may be based on the path loss reference.

Figure 11:
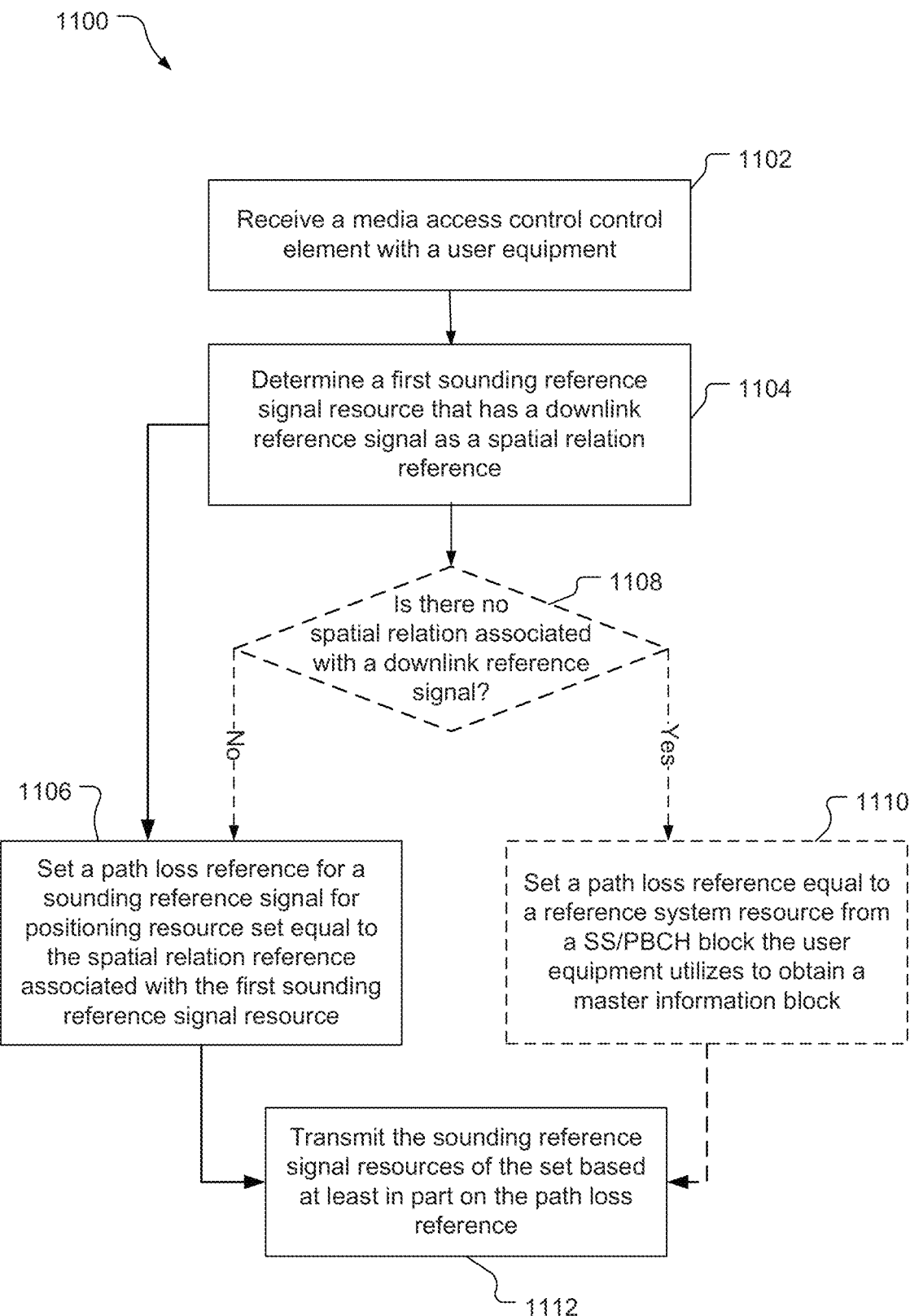
FIG. 11 is a process flow diagram of a second example method for transmitting a SP SRS-for-positioning based on a path-loss reference.

Referring to FIG. 11, with further reference to FIGS. 1-9, a second method 1100 for transmitting a SP SRS-for-positioning based on a path-loss reference includes the stages shown. The method 1100 is, however, an example only and not limiting. The method 1100 may be altered, e.g., by having stages added, removed, rearranged, combined, performed concurrently, and/or having single stages split into multiple stages. For example, one or more stages may occur before, and/or one or more stages may occur after, the stages shown in FIG. 11.

At stage 1102, the method includes receiving a Media Access Control Control Element (MAC CE) with a user equipment. The transceiver 310, processing system 332, memory 340, and/or SP SRS-for-positioning module 342, may be considered means for receiving the MAC CE. In an example, the MAC CE may be transmitted on the PDSCH. The MAC CE may indicate activation of a semi-persistent sounding reference signal (SP SRS)-for-positioning. In an example, a reserved bit (the "R" field) in the MAC CE or an LCID of a MAC subheader of the MAC CE indicates the activation or deactivation of the SP SRS-for-positioning. The MAC CE is also used to update the spatial relation information (e.g., 904a, 906a, 908a, 910a) of the SRS resource set 902.

At stage 1104, the method includes determining a first sounding reference signal resource that has a downlink reference as a spatial relation reference. The processing system 332, memory 340, and/or SP SRS-for-positioning module 342, may be considered means for determining the first downlink spatial relation reference. RRC signalling received by the user equipment may include the SRS resource set 902 for positioning. The SRS resource set 902 includes a plurality of SRS resources 904, 906, 908, 910 each with a respective spatial relation references 904a, 906a, 908a, 910a. The UE may be configured to iterate through the SRS resources 904, 906, 908, 910 until one of the respective spatial relation references 904a, 906a, 908a, 910a is determined to be associated with a downlink reference signal. For example, the UE may be configured with a set of downlink reference signals (CSI-RS or SS Block) which may be included as one of the spatial relation references in the SRS resource set 902. The downlink reference signal may be from a neighboring cell.

At stage 1106, the method includes setting a path loss reference for a sounding reference signal for positioning resource set equal to the spatial relation reference associated with the first sounding reference signal resource. The processing system 332, memory 340, and/or SP SRS-for-positioning module 342, may be considered means for setting the path loss reference. The path loss reference is set to the spatial relation reference associated with the first SRS resource (i.e., the first SRS resource that is associated with a downlink reference signal) determined at stage 1104. In an embodiment, the method 1100 may optionally include stage 1108 (optional stages are shown in dashed lines in FIG. 11), to determine if there is no spatial relation associated with a downlink reference signal. The processing system 332, memory 340, and/or SP SRS-for-positioning module 342, may be considered means for determining if there is no spatial relation reference associated with a downlink reference signal. Optional stage 1108 is provided for the use case where none of the SRS resources 904, 906, 908, 910 are associated with a downlink reference signal. If the UE determines that there is no spatial relation reference associated with a downlink reference signal, then at optional stage 1110 a path loss reference is set to a reference system resource from a SS/PBCH block the UE utilizes to obtain a MIB. For example, the user equipment may be using a SS block from a serving cell and can measure the path loss for the serving cell. The path loss used for the SS block may be used for the SRS-for-positioning path loss.

At stage 1112, the method includes transmitting the sounding reference signal resources of the set based at least in part on the path loss reference. The transceiver 310, processing system 332, memory 340, and/or SP SRS-for-positioning module 342, may be considered means for transmitting a sounding reference signal. The user equipment is configured to transmit the SP SRS-for-positioning one or more SRS resources configured via the MAC CE. The SP SRS-for-positioning having transmission parameters adopted from the spatial relation reference signal and the path loss reference determined at stage 1108 (or stage 1110).

In an example, the power level of the transmission may be based on the path loss reference.

Figure 12:
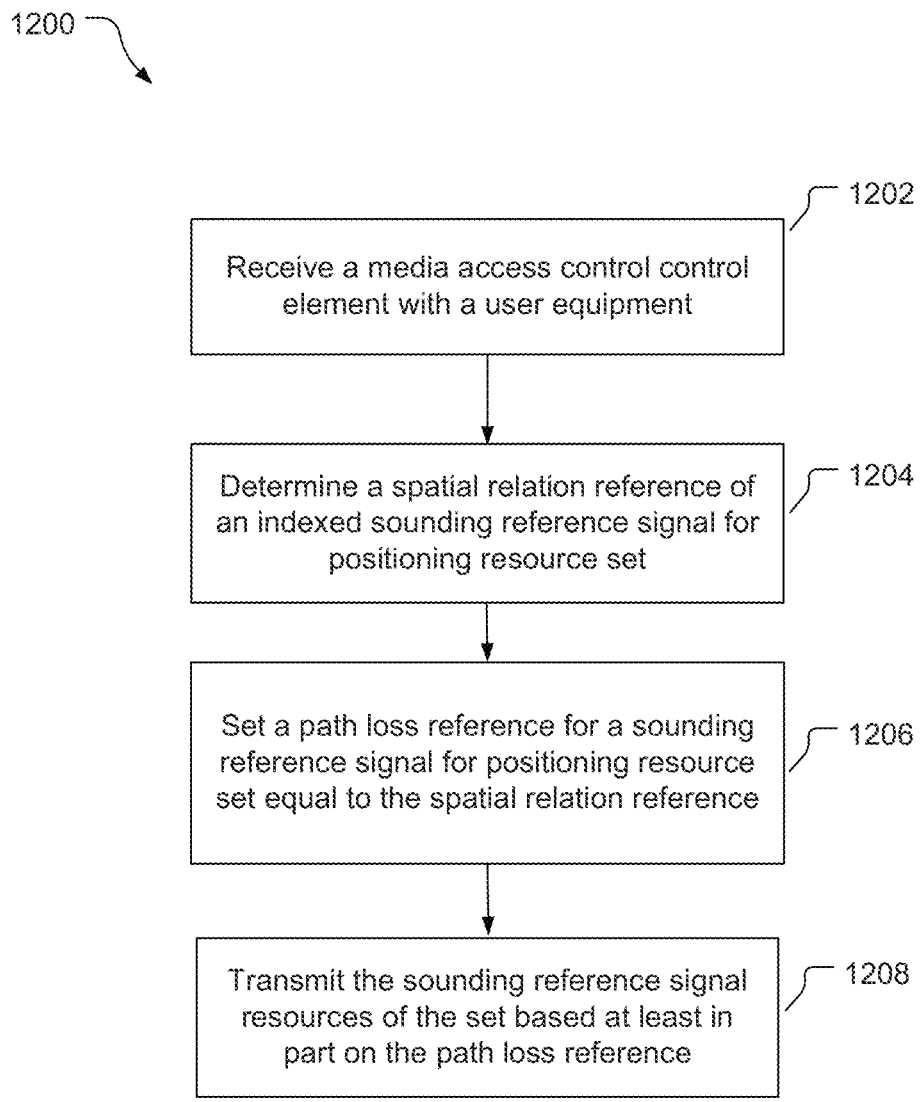
FIG. 12 is a process flow diagram of a third example method for transmitting a SP SRS-for-positioning based on a path-loss reference.

Referring to FIG. 12, with further reference to FIGS. 1-9, a third method 1200 for transmitting a SP SRS-for-positioning based on a path-loss reference includes the stages shown. The method 1200 is, however, an example only and not limiting. The method 1200 may be altered, e.g., by having stages added, removed, rearranged, combined, performed concurrently, and/or having single stages split into multiple stages. For example, one or more stages may occur before, and/or one or more stages may occur after, the stages shown in FIG. 12.

At stage 1202, the method includes receiving a Media Access Control Control Element (MAC CE) with a user equipment. The transceiver 310, processing system 332, memory 340, and/or SP SRS-for-positioning module 342, may be considered means for receiving the MAC CE. In an example, the MAC CE may be transmitted on the PDSCH. The MAC CE may indicate activation of a semi-persistent sounding reference signal (SP SRS)-for-positioning. In an example, a reserved bit (the "R" field) in the MAC CE or an LCID of a MAC subheader of the MAC CE indicates the activation or deactivation of the SP SRS-for-positioning. The MAC CE is also used to update the spatial relation information (e.g., 904a, 906a, 908a, 910a) of the SRS resource set 902.

At stage 1204, the method includes determining a spatial relation reference of an indexed sounding reference signal for positioning resource set. The processing system 332, memory 340, and/or SP SRS-for-positioning module 342, may be considered means for determining the spatial relation reference. In an example, RRC signaling may be used to provide the UE with a configured index of an SRS resource set which includes a spatial relation reference signal that may be used as the path loss reference for the whole SRS resource set. The MAC CE may be configured to update the indexed spatial relation reference signal that is used as the path loss reference for the whole set. In an example, the spatial relation reference may be from a neighboring cell.

At stage 1206, the method includes setting a path loss reference for a sounding reference signal for positioning resource set equal to the spatial relation reference. The processing system 332, memory 340, and/or SP SRS-for-positioning module 342, may be considered means for setting the path loss reference. For example, the path loss reference (i.e., PathLossReference parameter) may be set to the spatial relation reference determined at stage 1204 to be used as the path loss reference for the whole SRS resource set. In an example, if an indexed SRS resource set is not available, the path loss reference may be set to a reference system resource from a SS/PBCH block the UE utilizes to obtain a MIB as previously described.

At stage 1208, the method includes transmitting the sounding reference signal resources of the set based at least in part on the path loss reference. The transceiver 310, processing system 332, memory 340, and/or SP SRS-for-positioning module 342, may be considered means for transmitting a sounding reference signal. The user equipment is configured to transmit the SP SRS-for-positioning one or more SRS resources configured via the MAC CE. The SP SRS-for-positioning having transmission parameters adopted from the spatial relation reference signal and the path loss reference determined at stage 1206. In an example, the power level of the transmission may be based on the path loss reference.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a DSP, an ASIC, an FPGA, or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of wireless communication performed by a user equipment, comprising:
   receiving, from a serving base station, a medium access control (MAC) control element;
   determining a spatial relation reference of a first sounding reference signal resource;
   setting a path loss reference for a sounding reference signal for positioning resource set to the spatial relation reference if the spatial relation reference is not an uplink reference signal;
   setting the path loss reference equal to a reference system resource from a synchronization signal block the user equipment utilizes to obtain a master information block if the spatial relation reference is an uplink reference signal; and
   transmitting the resources of the sounding reference signal for positioning resource set based at least in part on the path loss reference.

2. The method of claim 1 wherein the MAC control element is configured to update the spatial relation reference of the first sounding reference signal resource.

3. The method of claim 1 further comprising receiving the sounding reference signal for positioning resource set from the serving base station via radio resource control signaling, wherein the first sounding reference signal resource is included in the sounding reference signal for positioning resource set.

4. The method of claim 1 wherein transmitting the all the resources of the sounding reference signal for positioning resource set includes adjusting a transmit power of the resources based at least in part on the path loss reference.

5. The method of claim 1 wherein the spatial relation reference is a downlink reference signal.

6. The method of claim 5 wherein the downlink reference signal is a channel state information reference signal or a synchronization signal reference signal.

7. The method of claim 5 wherein the downlink reference signal is from a neighboring cell.

8. The method of claim 1 wherein the synchronization signal block includes a primary synchronization signal, a secondary synchronization signal, or a physical broadcast channel.

9. A method of wireless communication performed by a user equipment, comprising:
   receiving, from a serving base station, a medium access control (MAC) control element;
   determining a first sounding reference signal resource that has a downlink reference signal as a spatial relation reference;
   setting a path loss reference for a sounding reference signal for positioning resource set equal to the spatial relation reference associated with the first sounding reference signal resource;
   setting the path loss reference equal to a reference system resource from a synchronization signal block the user equipment utilizes to obtain a master information block if there is no spatial relation associated with a downlink reference signal; and
   transmitting the sounding reference signal resources of the set based at least in part on the path loss reference.

10. The method of claim 9 wherein the synchronization signal block includes a primary synchronization signal, a secondary synchronization signal, or a physical broadcast channel.

11. The method of claim 9 wherein the MAC control element is configured to update the spatial relation reference of the first sounding reference signal resource.

12. The method of claim 9 further comprising receiving the sounding reference signal for positioning resource set from the serving base station via radio resource control signaling, wherein the first sounding reference signal resource is included in the sounding reference signal for positioning resource set.

13. The method of claim 9 wherein transmitting the sounding reference signal resources of the set includes adjusting a transmit power of the resources based on the path loss reference.

14. The method of claim 9 wherein the spatial relation reference is from a neighboring cell.

15. A method of wireless communication performed by a user equipment, comprising:
   receiving, from a serving base station, a medium access control (MAC) control element;
   determining a spatial relation reference of an indexed sounding reference signal for positioning resource set;
   setting a path loss reference for a sounding reference signal for positioning resource set equal to the spatial relation reference, wherein the indexed sounding reference signal for positioning resource set includes a plurality of sounding reference signal resources and the path loss reference is used for each of the plurality of sounding reference signal resources; and
   transmitting the sounding reference signal resources of the set based at least in part on the path loss reference.

16. The method of claim 15 wherein the MAC control element is configured to update the spatial relation reference of the indexed sounding reference signal for positioning resource set.

17. The method of claim 15 further comprising receiving the indexed sounding reference signal for positioning resource set from the serving base station via radio resource control signaling.

18. The method of claim 15 wherein transmitting the sounding reference signal resources of the set includes adjusting a transmit power of the resources based on the path loss reference.

19. An apparatus for wireless communication, comprising:
a memory;
a transceiver;
at least one processor operably coupled to the memory and the transceiver and configured to:
receive, from a serving base station, a (MAC) control element;
determine a spatial relation reference of a first sounding reference signal resource;
set a path loss reference for a sounding reference signal for positioning resource set to the spatial relation reference if the spatial relation reference is not an uplink reference signal;
set the path loss reference equal to a reference system resource from a synchronization signal block a user equipment utilizes to obtain a master information block if the spatial relation reference is an uplink reference signal; and
transmit the resources of the sounding reference signal for positioning resource set based at least in part on the path loss reference.

20. The apparatus of claim 19 wherein the MAC control element is configured to update the spatial relation reference of the first sounding reference signal resource.

21. The apparatus of claim 19 wherein the at least one processor is further configured to receive the sounding reference signal for positioning resource set from the serving base station via radio resource control signaling, wherein the first sounding reference signal resource is included in the sounding reference signal for positioning resource set.

22. The apparatus of claim 19 wherein the at least one processor is further configured to adjust a transmit power of the resources based at least in part on the path loss reference.

23. The apparatus of claim 19 wherein the spatial relation reference is a downlink reference signal.

24. The apparatus of claim 23 wherein the downlink reference signal is a channel state information reference signal or a synchronization signal reference signal.

25. The apparatus of claim 23 wherein the downlink reference signal is from a neighboring cell.

26. The apparatus of claim 19 wherein the synchronization signal block includes a primary synchronization signal, a secondary synchronization signal, or a physical broadcast channel.

27. An apparatus for wireless communication, comprising:
a memory;
a transceiver;
at least one processor operably coupled to the memory and the transceiver and configured to:
receive, from a serving base station, a medium access control MAC control element;
determine a first sounding reference signal resource that has a downlink reference signal as a spatial relation reference;
set a path loss reference for a sounding reference signal for positioning resource set equal to the spatial relation reference associated with the first sounding reference signal resource;
set the path loss reference equal to a reference system resource from a synchronization signal block the user equipment utilizes to obtain a master information block if there is no spatial relation associated with a downlink reference signal; and
transmit the sounding reference signal resources of the set based at least in part on the path loss reference.

28. The apparatus of claim 27 wherein the synchronization signal block includes a primary synchronization signal, a secondary synchronization signal, or a physical broadcast channel.

29. The apparatus of claim 27 wherein the MAC control element is configured to update the spatial relation reference of the first sounding reference signal resource.

30. The apparatus of claim 27 wherein the at least one processor is further configured to receive the sounding reference signal for positioning resource set from the serving base station via radio resource control signaling, wherein the first sounding reference signal resource is included in the sounding reference signal for positioning resource set.

31. The apparatus of claim 27 wherein the at least one processor is further configured to adjust a transmit power of the resources based on the path loss reference.

32. The apparatus of claim 27 wherein the spatial relation reference is from a neighboring cell.

33. An apparatus for wireless communication, comprising:
a memory;
a transceiver;
at least one processor operably coupled to the memory and the transceiver and configured to:
receive, from a serving base station, a medium access control (MAC) control element;
determine a spatial relation reference of an indexed sounding reference signal for positioning resource set;
set a path loss reference for a sounding reference signal for positioning resource set equal to the spatial relation reference, wherein the indexed sounding reference signal for positioning resource set includes a plurality of sounding reference signal resources and the path loss reference is used for each of the plurality of sounding reference signal resources; and
transmit the sounding reference signal resources of the set based at least in part on the path loss reference.

34. The apparatus of claim 33 wherein the MAC control element is configured to update the spatial relation reference of the indexed sounding reference signal for positioning resource set.

35. The apparatus of claim 33 wherein the at least one processor is further configured to receive the indexed sounding reference signal for positioning resource set from the serving base station via radio resource control signaling.

36. The apparatus of claim 33 wherein the at least one processor is further configured to adjust a transmit power of the resources based on the path loss reference.

37. An apparatus for wireless communication, comprising:
means for receiving, from a serving base station, a medium access control (MAC) control element;
means for determining a spatial relation reference of a first sounding reference signal resource;
means for setting a path loss reference for a sounding reference signal for positioning resource set to the spatial relation reference if the spatial relation reference is not an uplink reference signal;
means for setting the path loss reference equal to a reference system resource from a synchronization signal block a user equipment utilizes to obtain a master information block if the spatial relation reference is an uplink reference signal; and means for transmitting the resources of the sounding reference signal for positioning resource set based at least in part on the path loss reference.

38. The apparatus of claim 37 wherein the MAC control element is configured to update the spatial relation reference of the first sounding reference signal resource.

39. The apparatus of claim 37 further comprising means for receiving the sounding reference signal for positioning resource set from the serving base station via radio resource control signaling, wherein the first sounding reference signal resource is included in the sounding reference signal for positioning resource set.

40. The apparatus of claim 37 wherein the means for transmitting the all the resources of the sounding reference signal for positioning resource set includes means for adjusting a transmit power of the resources based at least in part on the path loss reference.

41. The apparatus of claim 37 wherein the spatial relation reference is a downlink reference signal.

42. The apparatus of claim 41 wherein the downlink reference signal is a channel state information reference signal or a synchronization signal reference signal.

43. The apparatus of claim 41 wherein the downlink reference signal is from a neighboring cell.

44. The apparatus of claim 37 wherein the synchronization signal block includes a primary synchronization signal, a secondary synchronization signal, or a physical broadcast channel.

45. An apparatus for wireless communication, comprising:
means for receiving, from a serving base station, a medium access control (MAC) control element;
means for determining a first sounding reference signal resource that has a downlink reference signal as a spatial relation reference;
means for setting a path loss reference for a sounding reference signal for positioning resource set equal to the spatial relation reference associated with the first sounding reference signal resource;
means for setting the path loss reference equal to a reference system resource from a synchronization signal block the user equipment utilizes to obtain a master information block if there is no spatial relation associated with a downlink reference signal; and
means for transmitting the sounding reference signal resources of the set based at least in part on the path loss reference.

46. The apparatus of claim 45 wherein the synchronization signal block includes a primary synchronization signal, a secondary synchronization signal, or a physical broadcast channel.

47. The apparatus of claim 45 wherein the (MAC) control element is configured to update the spatial relation reference of the first sounding reference signal resource.

48. The apparatus of claim 45 further comprising means for receiving the sounding reference signal for positioning resource set from the serving base station via radio resource control signaling, wherein the first sounding reference signal resource is included in the sounding reference signal for positioning resource set.

49. The apparatus of claim 45 wherein the means for transmitting the sounding reference signal resources of the set includes means for adjusting a transmit power of the resources based on the path loss reference.

50. The apparatus of claim 45 wherein the spatial relation reference is from a neighboring cell.

51. An apparatus for wireless communication, comprising:
means for receiving, from a serving base station, a medium access control (MAC) control element;
means for determining a spatial relation reference of an indexed sounding reference signal for positioning resource set;
means for setting a path loss reference for a sounding reference signal for positioning resource set equal to the spatial relation reference, wherein the indexed sounding reference signal for positioning resource set includes a plurality of sounding reference signal resources and the path loss reference is used for each of the plurality of sounding reference signal resources; and
means for transmitting the sounding reference signal resources of the set based at least in part on the path loss reference.

52. The apparatus of claim 51 wherein the MAC control element is configured to update the spatial relation reference of the indexed sounding reference signal for positioning resource set.

53. The apparatus of claim 51 further comprising means for receiving the indexed sounding reference signal for positioning resource set from the serving base station via radio resource control signaling.

54. The apparatus of claim 51 wherein the means for transmitting the sounding reference signal resources of the set includes means for adjusting a transmit power of the resources based on the path loss reference.

55. A non-transitory processor-readable storage medium comprising processor-readable instructions configured to cause one or more processors in a user equipment to communicate wirelessly, comprising:
code for receiving, from a serving base station, a medium access control (MAC) control element;
code for determining a spatial relation reference of a first sounding reference signal resource;
code for setting a path loss reference for a sounding reference signal for positioning resource set to the spatial relation reference if the spatial relation reference is not an uplink reference signal;
code for setting the path loss reference equal to a reference system resource from a synchronization signal block the user equipment utilizes to obtain a master information block if the spatial relation reference is an uplink reference signal; and
code for transmitting the resources of the sounding reference signal for positioning resource set based at least in part on the path loss reference.

56. A non-transitory processor-readable storage medium comprising processor-readable instructions configured to cause one or more processors in a user equipment to communicate wirelessly, comprising:
code for receiving, from a serving base station, a medium access control (MAC) control element;
code for determining a first sounding reference signal resource that has a downlink reference signal as a spatial relation reference;
code for setting a path loss reference for a sounding reference signal for positioning resource set equal to the spatial relation reference associated with the first sounding reference signal resource;
code for setting the path loss reference equal to a reference system resource from a synchronization signal block the user equipment utilizes to obtain a master information block if there is no spatial relation associated with a downlink reference signal; and code for transmitting the sounding reference signal resources of the set based at least in part on the path loss reference.

57. A non-transitory processor-readable storage medium comprising processor-readable instructions configured to cause one or more processors in a user equipment to communicate wirelessly, comprising:

code for receiving, from a serving base station, a medium access control (MAC) control element;

code for determining a spatial relation reference of an indexed sounding reference signal for positioning resource set;

code for setting a path loss reference for a sounding reference signal for positioning resource set equal to the spatial relation reference, wherein the indexed sounding reference signal for positioning resource set includes a plurality of sounding reference signal resources and the path loss reference is used for each of the plurality of sounding reference signal resources; and code for transmitting the sounding reference signal resources of the set based at least in part on the path loss reference.

* * * * *